United States Patent
Tamura et al.

(10) Patent No.: US 11,762,307 B2
(45) Date of Patent: Sep. 19, 2023

(54) TONER

(71) Applicant: CANON KABUSHIKI KAISHA, Tokyo (JP)

(72) Inventors: Junichi Tamura, Toride (JP); Takaho Shibata, Tokyo (JP); Ryuji Murayama, Nagareyama (JP); Kenta Mitsuiki, Toride (JP); Megumi Shino, Kashiwa (JP); Hironori Minagawa, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/987,599

(22) Filed: Aug. 7, 2020

(65) Prior Publication Data
US 2021/0055668 A1   Feb. 25, 2021

(30) Foreign Application Priority Data

Aug. 21, 2019   (JP) .................. 2019-151254

(51) Int. Cl.
*G03G 9/093* (2006.01)
*C08F 253/00* (2006.01)
(Continued)

(52) U.S. Cl.
CPC ....... *G03G 9/09321* (2013.01); *C08F 253/00* (2013.01); *G03G 9/0819* (2013.01); *G03G 9/08755* (2013.01)

(58) Field of Classification Search
CPC .......... G03G 9/08704; G03G 9/08795; G03G 9/08797; G03G 9/0827; G03G 9/08711;
(Continued)

(56) References Cited

U.S. PATENT DOCUMENTS 5,604,076 A * 2/1997 Patel ............... G03G 9/0806
                                                430/137.14
7,536,132 B2   5/2009 Minagawa et al.
(Continued)

FOREIGN PATENT DOCUMENTS

EP   2626745 A1 * 8/2013 ........... G03G 9/0806
JP   2015-045719   3/2015
(Continued)

OTHER PUBLICATIONS

Diamond, Arthur S., "Handbook of Imaging Materials", 2002, Marcel Dekker, Inc., 2nd Ed., p. 173-204 (Year: 2002).*
(Continued)

*Primary Examiner* — Peter L Vajda
*Assistant Examiner* — Boone Alexander Evans
(74) *Attorney, Agent, or Firm* — VENABLE LLP

(57) ABSTRACT

A toner having a toner particle containing a binder resin and a styrene-acrylic resin, the toner being characterized in that the styrene-acrylic resin is a graft polymer having an aliphatic hydrocarbon compound segment and a styrene-acrylic segment, the styrene-acrylic segment has a specific monomer unit, the melting point of the styrene-acrylic segment is from 30° C. to 80° C., and when the toner is measured using a FT-IR ATR method, the intensity assigned to the styrene-acrylic resin and the intensity assigned to the binder resin satisfy a specific relationship.

13 Claims, 1 Drawing Sheet

(51) Int. Cl.
*G03G 9/08* (2006.01)
*G03G 9/087* (2006.01)

(58) Field of Classification Search
CPC ........... G03G 9/08782; G03G 9/09307; G03G 9/08791; G03G 9/0812; G03G 9/0815; G03G 9/09321; G03G 9/0804
See application file for complete search history.

(56) References Cited

U.S. PATENT DOCUMENTS

| | | | |
|---|---|---|---|
| 7,833,687 B2 | 11/2010 | Kato et al. | |
| 8,697,327 B2 | 4/2014 | Shibata et al. | |
| 9,057,970 B2 | 6/2015 | Ida et al. | |
| 9,075,328 B2 | 7/2015 | Minagawa et al. | |
| 9,348,247 B2 | 5/2016 | Ida et al. | |
| 9,372,420 B2 | 6/2016 | Mizo et al. | |
| 9,500,975 B2 | 11/2016 | Sugahara et al. | |
| 9,540,483 B2 | 1/2017 | Ida et al. | |
| 9,599,920 B2 | 3/2017 | Sugahara et al. | |
| 9,665,021 B2 | 5/2017 | Ohtsu et al. | |
| 9,671,707 B2 | 6/2017 | Minagawa et al. | |
| 9,696,644 B2 | 7/2017 | Ida et al. | |
| 9,778,598 B2 | 10/2017 | Onozaki et al. | |
| 9,785,070 B2 | 10/2017 | Sugahara et al. | |
| 9,897,934 B2 | 2/2018 | Tamura et al. | |
| 9,958,809 B2 | 5/2018 | Sugahara et al. | |
| 9,969,834 B2 | 5/2018 | Ohtsu et al. | |
| 10,007,206 B2 | 6/2018 | Sugahara et al. | |
| 10,012,918 B2 | 7/2018 | Ishigami et al. | |
| 10,012,920 B2 | 7/2018 | Shibata et al. | |
| 10,012,921 B2 | 7/2018 | Kamae et al. | |
| 10,025,212 B2 | 7/2018 | Nishikawa et al. | |
| 10,078,281 B2 | 9/2018 | Ida et al. | |
| 10,088,765 B2 | 10/2018 | Miyakai et al. | |
| 10,133,201 B2 | 11/2018 | Kamae et al. | |
| 10,203,619 B2 | 2/2019 | Yamashita et al. | |
| 10,216,108 B2 | 2/2019 | Iwasaki et al. | |
| 10,228,629 B2 | 3/2019 | Tamura et al. | |
| 10,234,777 B2 | 3/2019 | Ohtsu et al. | |
| 10,353,312 B2 | 7/2019 | Kamae et al. | |
| 10,409,188 B2 | 9/2019 | Sugahara et al. | |
| 10,423,090 B2 | 9/2019 | Ohtsu et al. | |
| 10,451,990 B2 | 10/2019 | Kamae et al. | |
| 10,514,624 B2 | 12/2019 | Tamura et al. | |
| 10,642,178 B2 | 5/2020 | Yamashita et al. | |
| 10,775,710 B1 | 9/2020 | Kamae et al. | |
| 2003/0165759 A1* | 9/2003 | Suzuki | G03G 9/0827 430/108.4 |
| 2013/0108955 A1 | 5/2013 | Shibata et al. | |
| 2014/0137428 A1 | 5/2014 | Takenaka et al. | |
| 2015/0099227 A1 | 4/2015 | Ida et al. | |
| 2018/0052402 A1* | 2/2018 | Iwasaki | G03G 9/08755 |
| 2018/0275540 A1 | 9/2018 | Matsuo et al. | |
| 2020/0050123 A1 | 2/2020 | Sugahara et al. | |
| 2020/0050124 A1 | 2/2020 | Matsuo et al. | |
| 2020/0057397 A1 | 2/2020 | Murayama et al. | |
| 2020/0064751 A1 | 2/2020 | Murayama et al. | |
| 2020/0073263 A1 | 3/2020 | Hama et al. | |
| 2020/0103777 A1 | 4/2020 | Sugahara et al. | |

FOREIGN PATENT DOCUMENTS

| | | | | |
|---|---|---|---|---|
| JP | 2016-81047 A | | 5/2016 | |
| JP | 2017116810 A | * | 6/2017 | |
| JP | 2017-134398 | | 8/2017 | |
| JP | 2017151428 A | * | 8/2017 | ......... G03G 9/08782 |
| JP | 2018-28660 A | | 2/2018 | |

OTHER PUBLICATIONS

Machine translation of the description of JP 2017116810 A (Year: 2022).*

* cited by examiner

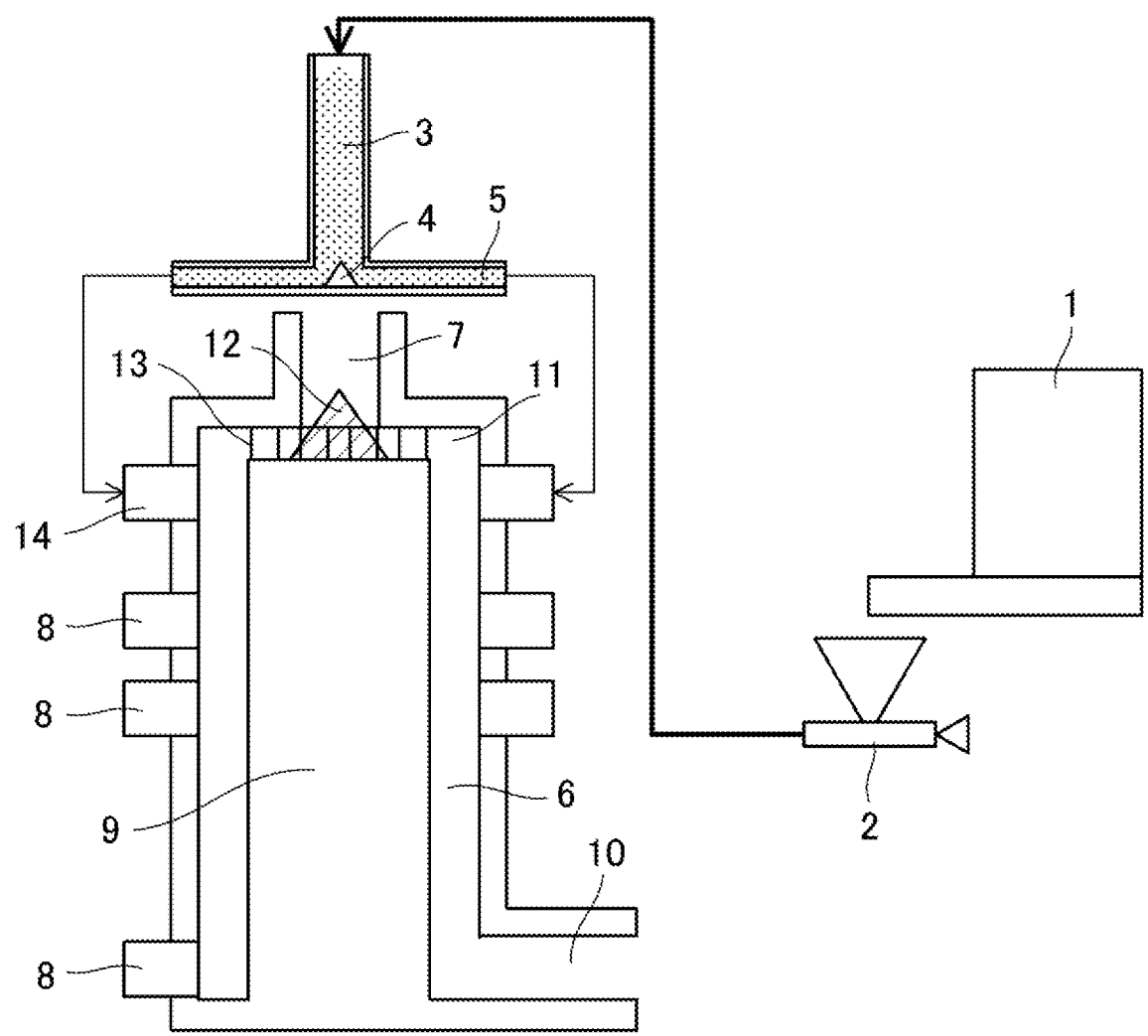

TONER

BACKGROUND OF THE INVENTION

Field of the Invention

The present invention relates to a toner for developing an electrostatic image used in, for example, electrophotography and electrostatic recording methods.

Description of the Related Art

As full-color electrophotographic copying machines have become more widespread in recent years, there have been demands for higher image quality and also for stability during long term storage.

In order to achieve higher image quality, it is essential to achieve high image reproducibility in processes such as developing, transfer and fixing. In transfer processes in particular, if a toner developed on an electrostatic latent image bearing member is efficiently transferred to an intermediate transfer member or media, it is possible to achieve high image reproducibility.

In order to achieve high transferability, it is essential for the force of an electric field received by a toner from a transfer device to be greater than attachment forces between the toner and a transfer precursor. Attachment forces are broadly classified into non-electrostatic attachment forces such as Van der Waals forces and electrostatic attachment forces such as electrostatic reflection forces.

Here, Japanese Patent Application Publication Nos. 2017-134398 and 2015-045719 have published means for lowering reflection forces by adding a low resistance material to a toner particle surface layer in order to increase transferability.

SUMMARY OF THE INVENTION

However, it is understood that the toner disclosed in Japanese Patent Application Publication No. 2017-134398 exhibits improved transferability but suffers from reduced charge maintaining properties as a result of low resistance. As a result, in cases where printing is carried out again after an interval between printing operations, it is necessary to carry out a recovery operation until the charge quantity of the toner increases.

In addition, it is understood that the toner disclosed in Japanese Patent Application Publication No. 2015-045719 exhibits improved transferability but an additive used for lowering reflection forces is compatible with a main binder and causes the glass transition temperature (hereinafter referred to simply as "Tg") of the toner to decrease and storability (for example, blocking resistance) to decrease.

The purpose of the present invention is to obtain a toner that exhibits all of transferability, charge maintaining properties and storability at a high level.

As a result of diligent research, the inventors of the present invention found that a toner that exhibits transferability, charge maintaining properties and storability could be obtained by causing a styrene-acrylic resin (a styrene-acrylic-based resin) that is a graft polymer having an aliphatic hydrocarbon compound segment and a styrene-acrylic segment to be localized close to a toner particle surface, using an acrylic acid ester having a long chain alkyl group in the styrene-acrylic segment, and crystallizing the styrene-acrylic segment.

That is the present invention relates to a toner comprising a toner particle that contains a binder resin and a styrene-acrylic resin, wherein:

the styrene-acrylic resin is a graft polymer having an aliphatic hydrocarbon compound segment and a styrene-acrylic segment;

the styrene-acrylic segment has a monomer unit represented by formula (1) below;

the melting point of the styrene-acrylic segment is from 30° C. to 80° C.; and when the toner is measured using a FT-IR ATR method, the value Z, as determined from formula (2) below, is from 1.5 to 9.0,

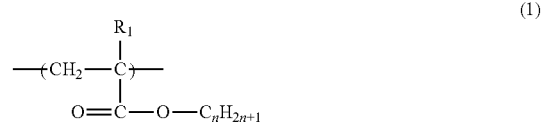
(1)

In formula (1), $R_1$ denotes a hydrogen atom or a methyl group, and n denotes an integer of from 18 to 30.

$$Z = (Ge\text{-}a/Ge\text{-}r)/(Dy\text{-}a/Dy\text{-}r) \quad (2)$$

In formula (2),

Ge-a is the intensity assigned to the styrene-acrylic resin when germanium is used as an ATR crystal, Ge-r is the intensity assigned to the binder resin when germanium is used as an ATR crystal, Dy-a is the intensity assigned to the styrene-acrylic resin when diamond is used as an ATR crystal, and Dy-r is the intensity assigned to the binder resin when diamond is used as an ATR crystal.

The present invention can provide a toner that exhibits all of transferability, charge maintaining properties and storability at a high level.

Further features of the present invention will become apparent from the following description of exemplary embodiments with reference to the attached drawings.

BRIEF DESCRIPTION OF THE DRAWINGS

The FIGURE is a schematic view of a heat treatment apparatus.

DESCRIPTION OF THE EMBODIMENTS

Unless specifically indicated otherwise, expressions such as "from XX to YY" and "XX to YY" that show numerical value ranges refer to numerical value ranges that include the lower limit and upper limit that are the end points.

The present invention relates to a toner comprising a toner particle that contains a binder resin and a styrene-acrylic resin, wherein:

the styrene-acrylic resin is a graft polymer having an aliphatic hydrocarbon compound segment and a styrene-acrylic segment;

the styrene-acrylic segment has a monomer unit represented by formula (1) below;

the melting point of the styrene-acrylic segment is from 30° C. to 80° C.; and when the toner is measured using a FT-IR ATR method, the value Z, as determined from formula (2) below, is from 1.5 to 9.0,

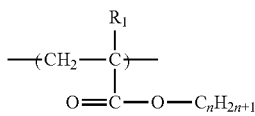

In formula (1), $R_1$ denotes a hydrogen atom or a methyl group, and n denotes an integer of from 18 to 30.

$$Z=(Ge\text{-}a/Ge\text{-}r)/(Dy\text{-}a/Dy\text{-}r) \qquad (2)$$

In formula (2),
Ge-a is the intensity assigned to the styrene-acrylic resin when germanium is used as an ATR crystal,
Ge-r is the intensity assigned to the binder resin when germanium is used as an ATR crystal,
Dy-a is the intensity assigned to the styrene-acrylic resin when diamond is used as an ATR crystal, and
Dy-r is the intensity assigned to the binder resin when diamond is used as an ATR crystal.

Constituent materials of the toner will now be explained.

Styrene-Acrylic Resin

The toner particle contains a styrene-acrylic resin. The styrene-acrylic resin is a graft polymer having an aliphatic hydrocarbon segment and a styrene-acrylic segment. In addition, the styrene-acrylic segment is crystalline. Being crystalline means that a clear endothermic peak is present in differential scanning calorimetric measurements.

The styrene-acrylic resin can also be used as a wax dispersing agent for the toner (hereinafter referred to simply as a wax dispersing agent).

The aliphatic hydrocarbon compound is not particularly limited, but should be selected from among the waxes listed below from the perspective of affinity with a wax in a toner particle.

The peak temperature of the maximum endothermic peak of the aliphatic hydrocarbon compound, as measured using a differential scanning calorimeter (DSC), is preferably from 60° C. to 110° C. In addition, the weight average molecular weight (Mw) of the aliphatic hydrocarbon compound is preferably from 900 to 50,000.

The aliphatic hydrocarbon compound contained in the aliphatic hydrocarbon compound segment is preferably at least one selected from the group consisting of polyethylene, polypropylene, alkylene copolymers and hydrocarbon-based waxes such as microcrystalline waxes, paraffin waxes and Fischer-Tropsch waxes. The aliphatic hydrocarbon compound is more preferably at least one selected from the group consisting of polypropylene and paraffin waxes.

In addition, from the perspective of reactivity during production of the styrene-acrylic resin, it is preferable for the aliphatic hydrocarbon compound to have a branched structure, such as that of polypropylene.

The content ratio of the aliphatic hydrocarbon compound segment is preferably from 5.0 mass % to 30.0 mass %, and more preferably from 10.0 mass % to 20.0 mass %, relative to the total amount of the graft polymer having an aliphatic hydrocarbon compound segment and a styrene-acrylic segment.

The graft polymer having an aliphatic hydrocarbon compound segment and a styrene-acrylic segment is preferably a graft polymer obtained by graft polymerizing a styrene-acrylic segment to an aliphatic hydrocarbon compound segment or a graft polymer obtained by graft polymerizing an aliphatic hydrocarbon compound segment to a styrene-acrylic segment. The graft polymer is more preferably a graft polymer obtained by graft polymerizing an aliphatic hydrocarbon compound segment to a styrene-acrylic segment.

Moreover, the graft modification method is not particularly limited, and a conventional publicly known method can be used.

The styrene-acrylic segment in the styrene-acrylic resin is not particularly limited as long as this segment has a monomer unit represented by formula (1) below and is crystalline. Moreover, "monomer unit" means a mode in which a monomer substance has reacted in a polymer.

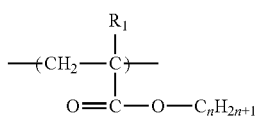

[In formula (1), $R_1$ denotes a hydrogen atom or a methyl group, and n denotes an integer of from 18 to 30.]

In formula (1), the value of n is preferably from 20 to 28, more preferably from 22 to 28, and further preferably 22. That is to say, a structure derived from behenyl acrylate or behenyl methacrylate.

If the number of carbon atoms represented by n falls within the range mentioned above, the advantageous effect of causing charge to be diffused in the toner can be achieved, and it is possible to prevent the fixing temperature from increasing while the melting point at the time of crystallization satisfies storability.

The content ratio of the monomer unit represented by formula (1) in the styrene-acrylic resin is preferably from 30 mass % to 80 mass %, and more preferably from 50 mass % to 70 mass %.

If the content ratio of the monomer unit represented by formula (1) falls within the range mentioned above, the styrene-acrylic segment exhibits crystallinity and storability improves.

The styrene-acrylic segment may be a homopolymer of the monomer unit represented by formula (1) or a copolymer of this monomer unit and another monomer (b). That is, the styrene-acrylic segment may have a monomer unit derived from a monomer (b) listed below.

Examples of the other monomer (b) include styrene-based monomers such as styrene, α-methylstyrene, p-methyl styrene, m-methyl styrene, p-methoxystyrene, p-hydroxystyrene, p-acetoxystyrene, vinyltoluene, ethyl styrene, phenyl styrene and benzylstyrene; vinyl ester-based monomers such as vinyl acetate; vinyl ether-based monomers such as vinyl methyl ether; halogen element-containing vinyl-based monomers such as vinyl chloride; diene-based monomers such as butadiene and isobutylene; and combinations of these. Styrene-based monomers are preferred, and styrene is more preferred.

The content ratio of the styrene-acrylic segment in the styrene-acrylic resin is preferably from 70 mass % to 95 mass %, and more preferably from 80 mass % to 90 mass %.

If this content ratio falls within the range mentioned above, the storability improvement effect achieved by the styrene-acrylic segment being crystalline can be achieved.

The melting point of the styrene-acrylic segment, as measured using a differential scanning calorimeter (DSC), must be from 30° C. to 80° C. It is preferable for this melting point to fall within the range mentioned above from the perspectives of low-temperature fixability and storability. This melting point is preferably from 40° C. to 80° C.

In a molecular weight distribution determined by means of gel permeation chromatography (GPC), the weight average molecular weight (Mw) of the styrene-acrylic resin is preferably from 5000 to 70,000, and more preferably from 10,000 to 50,000.

A styrene-acrylic resin having a weight average molecular weight (Mw) that falls within the range mentioned above also acts as a wax dispersing agent, meaning that dispersibility of a wax in a toner particle is improved and blocking resistance and hot offset resistance are also improved.

The content of the styrene-acrylic resin is preferably from 10 parts by mass to 30 parts by mass, and more preferably from 20 parts by mass to 30 parts by mass, relative to 100 parts by mass of binder resin. If this content falls within the range mentioned above, transferability, storability and charge maintaining properties are all readily achieved, and low-temperature fixability is improved.

The styrene-acrylic resin is localized close to a toner particle surface. That is to say, the styrene-acrylic resin is present at a greater quantity close to a toner particle surface than in the inner part of the toner particle. When the toner is measured using a FT-IR ATR method, the value of Z, as determined from the formula (2), must be from 1.5 to 9.0.

If the value of Z falls within the range mentioned above, the styrene-acrylic resin is localized at a toner particle surface. Due to this configuration, charge readily diffuses at the toner surface, meaning that transferability improves. In addition, by crystallizing both the aliphatic hydrocarbon compound segment and the styrene-acrylic segment in the styrene-acrylic resin, it is possible to achieve both charge maintaining properties and storability.

The value of Z is preferably from 5.0 to 9.0. The value of Z can be controlled in the toner production process, can be controlled by altering the heating time and heating temperature in a heat sphering process comprising heating in the case of a dry toner production method, and can be controlled by forming a shell in the case of a wet toner production method.

In addition, the surface of a toner particle preferably has a shell formed from the styrene-acrylic resin. The shell does not necessarily have to cover the whole of the toner particle, and there may be locations where the styrene-acrylic resin is not present on a part of the toner particle surface. Having a shell means a state whereby the styrene-acrylic resin covers the toner particle surface at a preferred thickness of at least 5 nm, with the coverage ratio being preferably at least 80 area %, and more preferably at least 90 area %.

The shell thickness and coverage ratio can be measured by measuring the form of a cross section of a toner particle.

A specific a method for measuring the form of a cross section of a toner particle comprises first thoroughly dispersing toner particles in a photocurable epoxy resin and then irradiating with ultraviolet radiation so as to cure the epoxy resin. A thin flake-like sample is produced by cutting the obtained cured product using a microtome equipped with a diamond blade.

After staining the sample using ruthenium tetroxide, the form of a cross section layer of the toner is observed using a transmission electron microscope (TEM) (H7500 available from Hitachi, Ltd.) at an accelerating voltage of 120 kV. In this observation method, amorphous portions of the toner particle are strongly stained by the ruthenium tetroxide. As a result, the core, whose primary component is an amorphous resin, is strongly stained, can be contrasted with the crystalline styrene-acrylic resin, which is the shell and is not stained, and the thickness and coverage ratio of the shell can be measured.

In cases where the ratio of portions where the thickness of the styrene-acrylic resin is at least 5 nm relative to the peripheral length of the cross section of the toner particle is preferably at least 80%, and more preferably at least 90%, it can be assessed that the toner particle has a shell.

The number-based median diameter D50 of the toner is preferably from 3.0 µm to 6.0 µm, and more preferably from 3.5 µm to 5.5 µm.

If the D50 value falls within the range mentioned above, an improvement in transferability due to a charge diffusion effect can be achieved to a significantly higher degree.

Binder Resin

The toner particle contains a binder resin. The binder resin is not particularly limited, and publicly known polymers commonly used in toners can be selected, as appropriate, according to purpose. Use of an amorphous resin is preferred as a main binder, but a crystalline resin may additionally be used in order to improve low-temperature fixability.

The content of the amorphous resin in the binder resin is preferably 50 mass % to 100 mass %, more preferably 80 mass % to 100 mass %, and further preferably 90 mass % to 100 mass %.

Amorphous Resin

The amorphous resin is not particularly limited and, more specifically, the polymers shown below can be used, homopolymers of styrene and its substituted forms, e.g., polystyrene, poly-p-chlorostyrene, and polyvinyltoluene; styrene copolymers, e.g., styrene-p-chlorostyrene copolymer, styrene-vinyltoluene copolymer, styrene-vinylnaphthalene copolymer, styrene-acrylate ester copolymers, styrene-methacrylate ester copolymers, styrene-methyl α-chloromethacrylate copolymer, styrene-acrylonitrile copolymer, styrene-vinyl methyl ether copolymer, styrene-vinyl ethyl ether copolymer, styrene-vinyl methyl ketone copolymer, and styrene-acrylonitrile-indene copolymer; as well as polyvinyl chloride, phenolic resins, natural resin-modified phenolic resins, natural resin-modified maleic acid resins, acrylic resins, methacrylic resins, polyvinyl acetate, silicone resins, polyurethane resins, polyamide resins, furan resins, epoxy resins, xylene resins, polyvinyl butyral, terpene resins, coumarone-indene resins, and petroleum resins.

The binder resin preferably contains a polyester resin, and more preferably is a polyester resin. An explanation will now be given of an example in which a polyester resin is selected as the binder resin, but the binder resin is not limited to a polyester resin.

The polyester resin is preferably an amorphous polyester resin. The polyester resin is not particularly limited, but examples thereof include polyester resins obtained through condensation polymerization of an alcohol component and a carboxylic acid component.

The alcohol component can be specifically exemplified by the following:

alkylene oxide adducts of bisphenol A, such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane, and also ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and derivatives of the preceding. These derivatives should provide the same resin structure by the aforementioned condensation polymerization, but are not otherwise particularly limited. Examples here are derivatives provided by the esterification of the alcohol component.

The carboxylic acid component, on the other hand, can be exemplified by the following:

aromatic dicarboxylic acids such as phthalic acid, isophthalic acid, and terephthalic acid, and their anhydrides; alkyldicarboxylic acids such as succinic acid, adipic acid, sebacic acid, and azelaic acid, and their anhydrides; succinic acid substituted by an alkyl group or alkenyl group having 6 to 18 carbons, and their anhydrides; unsaturated dicarboxylic acids such as fumaric acid, maleic acid, and citraconic acid, and their anhydrides; polybasic carboxylic acids such as trimellitic acid, pyromellitic acid, and benzophenonetetracarboxylic acid, and their anhydrides; and derivatives of the preceding. The derivatives should be dicarboxylic acid derivatives that provide the same resin structure by the aforementioned condensation polymerization, but are not otherwise particularly limited. Examples here are derivatives provided by the methyl esterification or ethyl esterification of the carboxylic acid component and derivatives provided by conversion of the carboxylic acid component into the acid chloride.

Preferred examples of the amorphous polyester resin are resins obtained by the condensation polymerization of an alcohol component that contains a compound selected from the group consisting of bisphenols represented by the following formula (1) and their derivatives, with a carboxylic acid component that contains a compound selected from the group consisting of dibasic and higher basic carboxylic acids and their derivatives (for example, fumaric acid, maleic acid, maleic anhydride, phthalic acid, terephthalic acid, trimellitic acid, and pyromellitic acid).

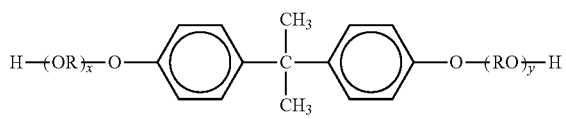

(1)

(In the formula, R represents an ethylene or propylene group; x and y are each integers equal to or greater than 1; and the average value of x+y is from 2 to 6.)

Another example is resin obtained by the condensation polymerization of an alcohol component containing a compound selected from the group consisting of bisphenols represented by the following formula (3) and derivatives thereof, with a carboxylic acid component containing a compound selected from the group consisting of aromatic dicarboxylic acids and derivatives thereof (for example, isophthalic acid, terephthalic acid).

The content of the compound selected from the group consisting of bisphenols represented by formula (3) and derivatives thereof is preferably from 50 mol % to 100 mol % and more preferably from 90 mol % to 100 mol % for the total amount in the alcohol component.

The content of the amorphous polyester resin is preferably from 25 mass % to 100 mass %, and more preferably from 50 mass % to 100 mass %, of the amorphous resin.

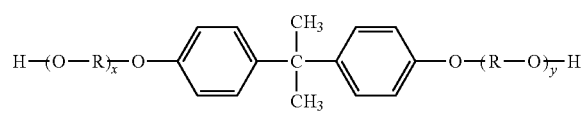

(3)

(In the formula, R is —$CH_2$—$CH(CH_3)$—, x and y are each an integer of at least 1, and the average value of x+y is from 2 to 6.)

The polyester resin preferably has an alkyl group side chain. The number of carbon atoms in the alkyl group is preferably from 10 to 20, and more preferably from 12 to 18.

The alkyl group side chain can be introduced into the polyester resin by using a monomer having an alkyl group, such as dodecylsuccinic acid, as a monomer of the polyester resin.

By having this type of side chain, compatibility with the styrene-acrylic resin increases, the styrene-acrylic resin does not separate, and a more uniform shell can be formed.

The glass transition temperature of the amorphous resin is preferably from 30° C. to 80° C.

The storability is improved when the glass transition temperature is at least 30° C.

In addition, in high-temperature, high-humidity environments, the charging performance is also improved due to a suppression of the reduction in resistance caused by the molecular motion of the resin.

The low-temperature fixability is improved, on the other hand, when the glass transition temperature is not more than 80° C.

The glass transition temperature is more preferably at least 40° C. from the standpoint of the storability. The glass transition temperature, on the other hand, is more preferably not more than 70° C. from the standpoint of the low-temperature fixability.

The softening temperature (Tm) of the amorphous resin is preferably from 70° C. to 150° C., more preferably from 80° C. to 140° C., and even more preferably from 80° C. to 130° C.

When the softening temperature (Tm) is in the indicated range, an excellent coexistence between the coagulation resistance and offset resistance is engineered and in addition a low degree of penetration by the melted toner components into the paper is obtained during the high temperatures during fixation and an excellent surface smoothness is obtained.

The amorphous resin preferably has an ionic group, i.e., a carboxylic acid group, sulfonic acid group, or amino group, in the resin skeleton, and the incorporation of a carboxylic acid group is more preferred.

The acid value of the amorphous resin is preferably 3 mg KOH/g to 35 mg KOH/g and is more preferably 8 mg KOH/g to 25 mg KOH/g.

An excellent charge quantity is obtained, in both high-humidity environments and low-humidity environments, when the acid value of the amorphous resin is in the indicated range. The acid value is the number of milligrams of potassium hydroxide required to neutralize, e.g., the free fatty acid, resin acid, and so forth, present in 1 g of a sample. Measurement according to JIS K 0070 is carried out for the measurement method.

Colorant

A colorant may be used in the toner particle. This colorant can be exemplified as follows.

The black colorants can be exemplified by carbon black and by black colorants obtained by color mixing using a yellow colorant, magenta colorant, and cyan colorant to give a black color. A pigment may be used by itself for the colorant, but the enhanced sharpness provided by the co-use of a dye with a pigment is more preferred from the standpoint of the image quality of full-color images.

Pigments for magenta toners can be exemplified by the following: C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C. I. Pigment Violet 19; and C. I. Vat Red 1, 2, 10, 13, 15, 23, 29, and 35.

Dyes for magenta toners can be exemplified by the following: oil-soluble dyes such as C. I. Solvent Red 1, 3, 8, 23, 24, 25, 27, 30, 49, 81, 82, 83, 84, 100, 109, and 121; C. I. Disperse Red 9; C. I. Solvent Violet 8, 13, 14, 21, and 27; and C. I. Disperse Violet 1, and basic dyes such as C. I. Basic Red 1, 2, 9, 12, 13, 14, 15, 17, 18, 22, 23, 24, 27, 29, 32, 34, 35, 36, 37, 38, 39, and 40 and C. I. Basic Violet 1, 3, 7, 10, 14, 15, 21, 25, 26, 27, and 28.

Pigments for cyan toners can be exemplified by the following: C. I. Pigment Blue 2, 3, 15:2, 15:3, 15:4, 16, and 17; C. I. Vat Blue 6; C. I. Acid Blue 45; and copper phthalocyanine pigments having at least 1 and not more than 5 phthalimidomethyl groups substituted on the phthalocyanine skeleton.

C. I. Solvent Blue 70 is an example of a dye for cyan toners.

Pigments for yellow toners can be exemplified by the following: C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185 and by C. I. Vat Yellow 1, 3, and 20.

C. I. Solvent Yellow 162 is an example of a dye for yellow toners.

A single one of these colorants may be used or a mixture may be used and these colorants may also be used in a solid solution state.

The colorant may be selected considering the hue angle, chroma, lightness, lightfastness, OHP transparency, and dispersibility in the toner particle.

The colorant content is preferably 1 mass part to 20 mass parts per 100 mass parts of the resin component that constitutes the toner particle.

Release Agent

The toner particle may contain a release agent, and examples of release agents include those listed below:

hydrocarbon waxes such as low molecular weight polyethylene, low molecular weight polypropylene, alkylene copolymers, microcrystalline wax, paraffin wax, and Fischer-Tropsch waxes; oxides of hydrocarbon waxes, such as oxidized polyethylene wax, and their block copolymers; waxes in which the major component is fatty acid ester, such as carnauba wax; and waxes provided by the partial or complete deacidification of fatty acid esters, such as deacidified carnauba wax.

Additional examples are as follows: saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohols, behenyl alcohol, carnaubyl alcohol, ceryl alcohol, and melissyl alcohol; polyhydric alcohols such as sorbitol; esters between a fatty acid such as palmitic acid, stearic acid, behenic acid, or montanic acid and an alcohol such as stearyl alcohol, aralkyl alcohol, behenyl alcohol, carnaubyl alcohol, ceryl alcohol, or melissyl alcohol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; fatty acid metal salts (generally known as metal soaps) such as calcium stearate, calcium laurate, zinc stearate, and magnesium stearate; waxes provided by grafting an aliphatic hydrocarbon wax using a vinyl monomer such as styrene or acrylic acid; partial esters between a fatty acid and a polyhydric alcohol, such as behenyl monoglyceride; and hydroxyl group-containing methyl ester compounds obtained by the hydrogenation of plant oils.

Of these waxes, low molecular weight polypropylene and hydrocarbon waxes such as paraffin waxes and Fischer-Tropsch waxes, and fatty acid ester-based waxes such as carnauba wax are preferred from the perspective of improving low-temperature fixability and hot offset resistance. In the present invention, hydrocarbon waxes are more preferred from the perspective of further improving hot offset resistance.

In the present invention, the wax content is preferably from 1.0 part by mass to 20.0 parts by mass relative to 100.0 parts by mass of the binder resin.

In addition, the peak temperature of the maximum endothermic peak of the wax, as measured using a differential scanning calorimeter (DSC), is preferably from 45° C. to 140° C., and more preferably from 70° C. to 100° C. A case where the peak temperature of the maximum endothermic peak of the wax falls within the range mentioned above is more preferred from the perspective of achieving both blocking resistance and hot offset resistance in the toner.

Charge Control Agent

The toner particle A may contain the charge control agent in on an optional basis. A known charge control agent can be used for the charge control agent, but metal compounds of aromatic carboxylic acids that are colorless, provide a high toner charging speed, and can maintain a stable and constant amount of charge are particularly preferred.

Negative-charging charge control agents can be exemplified by the following: metal salicylate compounds, metal naphthoate compounds, metal dicarboxylate compounds, polymer compounds having sulfonic acid or carboxylic acid in side chain position, polymer compounds having a sulfonate salt or sulfonate ester in side chain position, polymer compounds having a carboxylate salt or carboxylate ester in side chain position, boron compounds, urea compounds, silicon compounds, and calixarene.

Positive-charging charge control agents can be exemplified by quaternary ammonium salts, polymer compounds having a quaternary ammonium salt in side chain position, guanidine compounds, and imidazole compounds. The charge control agent may be internally added or externally added to the toner particle.

The content of the charge control agent is preferably from 0.2 parts by mass to 10.0 parts by mass relative to 100.0 parts by mass of the binder resin.

Inorganic Fine Particles

The toner may contain inorganic fine particles if necessary.

The inorganic fine particles may be internally added to the toner particle or mixed as an external additive with the toner particle.

In cases where inorganic fine particles are contained as an external additive, inorganic fine particles such as silica fine particles, titanium oxide fine particles and aluminum oxide fine particles are preferred.

These inorganic fine particles are preferably hydrophobized by means of a hydrophobizing agent such as a silane compound, a silicone oil or a mixture of these.

In cases where the inorganic fine particles are used to improve the flowability of the toner, the specific surface area thereof is preferably from 50 $m^2/g$ to 400 $m^2/g$.

Meanwhile, in cases where the inorganic fine particles are used to improve the durability of the toner, the specific surface area thereof is preferably from 10 $m^2/g$ to 50 $m^2/g$.

In order to improve both flowability and durability, it is possible to use a combination of types of inorganic fine particles whose specific surface areas fall within the ranges mentioned above.

In cases where the inorganic fine particles are an external additive, the content thereof is preferably from 0.1 parts by mass to 10.0 parts by mass relative to 100.0 parts by mass of the toner particles. When mixing the toner particles with the inorganic fine particles, a publicly known mixer such as a Henschel mixer should be used.

Magnetic Carrier

The toner can also be used as a single component developer, but from the perspective of further improving dot reproducibility and providing stable images over a long period of time, the toner can be used as a two component developer that is mixed with a magnetic carrier.

The magnetic carrier can be an ordinary publicly known carrier, such as iron oxide; particles of a metal such as iron, lithium, calcium, magnesium, nickel, copper, zinc, cobalt, manganese, chromium or a rare earth element, or particles of alloys or oxides of these metals; a magnetic material such as ferrite; or a magnetic material-dispersed resin carrier (a so-called resin carrier) that contains a magnetic material and a binder resin that holds the magnetic material in a dispersed state.

The mixing ratio of the magnetic carrier and the toner is such that the concentration of the toner in the two component developer is preferably from 2 mass % to 15 mass %, and more preferably from 4 mass % to 13 mass %.

Toner Production Method

A known toner production method can be adopted, e.g., the suspension polymerization method, kneading pulverization method, emulsion aggregation method, and dissolution suspension method, but there is no limitation to any of these methods.

Specific examples of the toner production method are provided below using the kneading pulverization method and emulsion aggregation method, but there is no limitation to or by these.

Kneading Pulverization Method

First, in a raw material mixing step, prescribed amounts of the styrene-acrylic resin, the binder resin and, if necessary, additives such as a wax are weighed out as toner raw materials, blended and mixed.

Examples of apparatuses used for the mixing include a Henschel mixer (available from Nippon Coke & Engineering Co., Ltd.); a super mixer (available from Kawata Mfg. Co., Ltd.); a Ribocone (available from Okawara Mfg. Co., Ltd.); a Nauta Mixer, Turbulizer or Cyclomix (available from Hosokawa Micron Corporation); a spiral pin mixer (available from Pacific Machinery & Engineering Co., Ltd.); and a Loedige Mixer (available from Matsubo Corporation).

Next, the obtained mixture is melted and kneaded so as to melt the binder resin and disperse the styrene-acrylic resin or the like therein (a melt kneading step).

Examples of apparatuses used for the melt kneading include a TEM type extruder (available from Toshiba Machine Co., Ltd.), a TEX twin screw kneader (available from The Japan Steel Works, Ltd.), a PCM kneader (available from Ikegai Corporation) and a Kneadex (available from Mitsui Kozan Kabushiki Kaisha). From the perspective of advantages such as enabling continuous production, a continuous kneader such as a single screw kneader or a twin screw kneader is preferred over a batch type kneader.

Next, the obtained melt kneaded product is rolled using a two-roll roller or the like, and then cooled by means of water or the like.

The obtained cooled product is then pulverized to a prescribed particle size. First, the cooled product is coarsely pulverized using a crusher, a hammer mill, a feather mill, or the like, and then finely pulverized using a Kryptron System (available from Kawasaki Heavy Industries, Ltd.), a Super Rotor (available from Nisshin Engineering Inc.), or the like, so as to obtain resin particles.

Toner particles may be obtained by classifying the obtained resin particles to a prescribed particle size. Examples of the apparatus used for the classification include a Turboplex, a Faculty, a TSP or TTSP (available from Hosokawa Micron Corporation) and an Elbow-Jet (available from Nittetsu Mining Co., Ltd.).

In addition, it is preferable to obtain toner particles by subjecting the obtained resin particles to a heat treatment. That is to say, the toner particles are preferably subjected to a surface treatment by means of heat. By carrying out a heat treatment, the styrene-acrylic resin is readily precipitated at a toner particle surface and transferability, charging performance and storability are all readily achieved.

Furthermore, in cases where coarse particles are present following the heat treatment, these coarse particles may be removed through classification or sieving if necessary. Examples of apparatuses used for the classification include the apparatuses mentioned above. Meanwhile, examples of apparatuses used for the sieving include an Ultrasonic (available from Koei Sangyo Co., Ltd.), a Rezona Sieve or Gyro Sifter (available from Tokuju Co., Ltd.), a Turbo Screener (available from Turbo Kogyo Co., Ltd.), and a Hi-Bolter (available from Toyo Hitec Co., Ltd.).

Meanwhile, inorganic fine particles and the like may, if necessary, be added to the obtained resin particles before the heat treatment step.

A specific example will now be given of a method for subjecting resin particles to a heat treatment using the heat treatment apparatus shown in the FIGURE.

Resin particles quantitatively supplied from a raw material quantitative supply means 1 are fed to an inlet tube 3 disposed vertically above a raw material supply means by means of a compressed gas regulated by a compressed gas flow rate regulation means 2. A mixture that passes through the inlet tube 3 is uniformly dispersed by a conical protruding member 4 provided in the center of the raw material supply means, is then fed to supply tubes 5 that extend in a radial manner in eight directions, and is then fed to a treatment chamber 6 in which a heat treatment is carried out.

At this point, the flow of resin particles supplied to the treatment chamber 6 is regulated by a regulation means 9 which is provided in the treatment chamber 6 and is used to regulate the flow of the resin particles. Therefore, the resin particles supplied to the treatment chamber 6 are subjected to the heat treatment while being swirled in the treatment chamber 6, and then cooled.

A hot air current, which is used to heat treat the supplied resin particles, is supplied from a hot air current supply means 7, partitioned by a partitioning member 12, and swirled and introduced in a spiral manner into the treatment chamber 6 by means of a swirling member 13 that is used to swirl the hot air current. In this configuration, the swirling member 13 that is used to swirl the hot air current has a plurality of blades, and swirling of the hot air current can be controlled by the number and angle of these blades.

The hot air current supplied to the treatment chamber 6 preferably has a temperature of from 100° C. to 300° C., and more preferably from 130° C. to 170° C., at the outlet of the hot air current supply means 7. If the temperature at the outlet of the hot air current supply means 7 falls within the range mentioned above, it is possible to uniformly treat the resin particles while preventing the particles from fusing and coalescing as a result of the particles being excessively heated.

The hot air current is supplied from the hot air current supply means 7. Furthermore, heat treated resin particles are cooled by a cold air current supplied from a cold air current supply means 8. The temperature of the cold air current supplied from the cold air current supply means 8 is preferably from −20° C. to 30° C. If the temperature of the cold air current falls within the range mentioned above, it is possible to efficiently cool the heat treated resin particles and prevent the heat treated resin particles from fusing and convalescing without impairing the uniform heat treatment of the resin particles. In addition, the absolute moisture content in the cold air current is preferably from 0.5 g/m$^3$ to 15.0 g/m$^3$.

Next, the cooled heat treated resin particles are recovered by a recovery means 10 located at the bottom of the treatment chamber 6. Moreover, a blower (not shown) is provided before the recovery means 10, and a configuration in which suction conveying occurs is formed as a result.

In addition, a powder particle supply port 14 is provided in such a way that the swirling direction of the supplied resin particles is the same as the swirling direction of the hot air current, and the recovery means 10 is also provided in a tangential direction at the outer periphery of the treatment chamber 6 so that the swirling direction of the swirled resin particles is maintained. Furthermore, the apparatus is configured so that the cold air current supplied from the cold air current supply means 8 is supplied from a horizontal and tangential direction from the outer periphery of the apparatus to the inner peripheral surface thereof.

The swirling direction of the yet-to-be heat treated resin particles supplied from the powder particle supply port 14, the swirling direction of the cold air current supplied from the cold air current supply means 8 and the swirling direction of the hot air current supplied from the hot air current supply means 7 are all the same direction. As a result, turbulence does not occur in the treatment chamber, swirling flow is enhanced in the apparatus, a strong centrifugal force is applied to the yet-to-be heat treated resin particles, and dispersibility of the yet-to-be heat treated resin particles is further improved, meaning that it is possible to obtain heat treated resin particles which have a uniform shape and which undergo little particle coalescence.

The average circularity of the toner is preferably at least 0.960, and more preferably at least 0.965. If the average circularity of the toner falls within the range mentioned above, the transfer efficiency of the toner improves.

Emulsion Aggregation Method

The emulsion aggregation method is a method in which an aqueous dispersion is prepared in advance of fine particles comprising the constituent materials of the toner particle, wherein these fine particles are sufficiently smaller than the target particle diameter; these fine particles are aggregated in the aqueous dispersion until the toner particle diameter is reached; and melt-adhesion of the resin is then induced by heating to produce the toner.

That is, the toner is produced in the emulsion aggregation method through a dispersion step of producing a dispersion of fine particles comprising the toner particle constituent materials; an aggregation step of aggregating the fine particles comprising the toner particle constituent materials, with control of the particle diameter until the particle diameter of the toner is reached; a fusion step in which the resin present in the resulting aggregate particle is melt-adhered; and an ensuing cooling step.

It is preferable to add a shell formation step in order to cause the styrene-acrylic resin to be localized close to the toner particle surface. Examples thereof include a method comprising adding a shell formation step following the aggregation step and a method comprising adding a shell formation step following the cooling step and then carrying out the fusion step and the cooling step so as to obtain the toner.

Dispersion Step

An aqueous dispersion of resin fine particles such as the styrene-acrylic resin and the binder resin can be prepared using a publicly known method, but this preparation method is not limited to these methods. Examples of publicly known methods include an emulsion polymerization method, a self-emulsification method, a phase inversion emulsification method in which an aqueous medium is added to a resin solution dissolved in an organic solvent so as to emulsify the resin, or a forcible emulsification method in which a resin is subjected to a high temperature treatment in an aqueous medium without using an organic solvent so as to forcibly emulsify the resin.

Specifically, the resins, such as the binder resin, are dissolved in organic solvents in which the resins dissolve, and a surfactant or a basic compound is added. Next, resin fine particles are precipitated by slowly adding an aqueous medium while agitating by means of a homogenizer or the like. A resin fine particle-dispersed aqueous solution is then prepared by heating or lowering the pressure so as to remove the solvent.

Any solvent able to dissolve the resins mentioned above can be used as the organic solvent, but use of an organic solvent that forms a uniform phase with water, such as tetrahydrofuran, is preferred from the perspective of suppressing the generation of coarse particles.

There are no particular limitations on the surfactant that may be used during this emulsification, and the surfactant can be exemplified by anionic surfactants such as sulfate ester salts, sulfonate salts, carboxylic acid salts, phosphate esters, soaps, and so forth; cationic surfactants such as amine salts, quaternary ammonium salts, and so forth; and nonionic surfactants such as polyethylene glycol types, ethylene oxide adducts of alkylphenols, polyhydric alcohol types, and so forth. A single one of these surfactants may be used by itself or two or more may be used in combination.

The basic compound used in this emulsification can be exemplified by inorganic bases such as sodium hydroxide, potassium hydroxide, and so forth, and by organic bases such as ammonia, triethylamine, trimethylamine, dimethylaminoethanol, diethylaminoethanol, and so forth. A single one of these bases may be used by itself or two or more may be used in combination.

The 50% particle diameter (d50) on a volume basis of the resin fine particles is preferably 0.05 μm to 1.0 μm, and more preferably 0.05 μm to 0.4 μm.

By adjusting the 50% particle diameter (d50) on a volume basis within the range mentioned above, it is easy to obtain toner particles having a preferred volume average particle diameter, that is, 4.0 μm to 7.0 μm.

Moreover, a dynamic light scattering particle size distribution analyzer (a Nanotrac UPA-EX150 available from Nikkiso Co., Ltd.) was used to measure the 50% particle diameter (d50) on a volume basis.

The aqueous dispersion of colorant fine particles that may be used on an optional basis can be prepared by the known method provided as an example herebelow, but there is no limitation to this procedure.

This preparation can be carried out by mixing the colorant, an aqueous medium, and a dispersing agent using a mixer such as a known stirrer, emulsifying apparatus, or disperser. The dispersing agent used here can be a known dispersing agent, i.e., a surfactant or polymeric dispersing agent.

While either dispersing agent, i.e., surfactant or polymeric dispersing agent, can be removed in the washing step described below, surfactant is preferred from the standpoint of the washing efficiency. Among surfactants, anionic surfactants and nonionic surfactants are more preferred.

The surfactant can be exemplified by anionic surfactants such as sulfate ester salts, sulfonate salts, phosphate esters, soaps, and so forth; cationic surfactants such as amine salts, quaternary ammonium salts, and so forth; and nonionic surfactants such as polyethylene glycol types, ethylene oxide adducts of alkylphenols, polyhydric alcohol types, and so forth. Among these, nonionic surfactants and anionic surfactants are preferred. In addition, a nonionic surfactant may be used in combination with an anionic surfactant. A single one of these surfactants may be used by itself or two or more may be used in combination.

The amount of the dispersing agent, per 100 mass parts of the colorant, is preferably from 1 mass part to 20 mass parts and, from the standpoint of the coexistence of the dispersion stability with the washing efficiency, from 2 mass parts to 10 mass parts is more preferred.

The content of the colorant in the colorant fine particle aqueous dispersion is not particularly limited, but from 1 mass % to 30 mass % with reference to the total mass of the colorant fine particle aqueous dispersion is preferred.

With regard to the dispersed particle diameter of the colorant fine particles in the aqueous dispersion, the 50% particle diameter (d50) on a volume basis is preferably not greater than 0.5 μm based on a consideration of the dispersity of the colorant in the ultimately obtained toner. For this same reason, the 90% particle diameter (d90) on a volume basis is also preferably not greater than 2 μm. The dispersed particle diameter of the colorant fine particles dispersed in the aqueous medium may be measured using a dynamic light-scattering particle distribution analyzer (Nanotrac UPA-EX150, Nikkiso Co., Ltd.).

The mixer, e.g., a known stirrer, emulsifying apparatus, or disperser, used to disperse the colorant in the aqueous medium can be exemplified by ultrasound homogenizers, jet mills, pressurized homogenizers, colloid mills, ball mills, sand mills, and paint shakers. A single one of these may be used by itself or a combination may be used.

An aqueous dispersion of fine particles of the optionally used release agent can be prepared by a known method, as exemplified in the following, but there is no limitation to these procedures.

An aqueous dispersion of release agent fine particles can be produced by adding the release agent to a surfactant-containing aqueous dispersion and heating to at least the melting point of the release agent; dispersing into particulate form using a homogenizer capable of applying a strong shear (for example, a "Clearmix W-Motion", M Technique Co., Ltd.) or using a pressure-ejection disperser (for example, a "Gaulin Homogenizer", Gaulin Co.); and subsequently cooling below or at the melting point.

With regard to the dispersed particle diameter of the colorant fine particles in the aqueous dispersion, the 50% particle diameter (d50) on a volume basis is preferably from 0.03 μm to 1.0 μm and is more preferably from 0.1 μm to 0.5 μm. Coarse particles of 1 μm and above are preferably not present.

By adopting this range for the dispersed particle diameter of the release agent fine particles, an excellent elution of the release agent during fixing is obtained and the hot offset temperature can then be raised, and it also becomes possible to suppress the production of filming at the photosensitive member.

The dispersed particle diameter of the release agent fine particles dispersed in the aqueous medium may be measured using a dynamic light-scattering particle distribution analyzer (Nanotrac UPA-EX150, Nikkiso Co., Ltd.).

Aggregation Step

In the aggregation step, the styrene-acrylic resin fine particle-dispersed aqueous solution, the binder resin fine particle-dispersed aqueous solution and, if necessary, the release agent fine particle-dispersed aqueous solution and the colorant fine particle-dispersed aqueous solution are mixed so as to prepare a mixed solution.

The fine particles contained in the thusly prepared mixture are then aggregated to form aggregate particles having a target particle diameter. Here, the formation of aggregate particles—in which the resin fine particles, colorant fine particles, and release agent fine particles are aggregated—preferably is brought about by the addition of an aggregating agent with mixing and as necessary by the suitable application of heating and/or mechanical force.

An aggregating agent containing an at least divalent metal ion is preferably used as this aggregating agent.

Aggregating agents that contain an at least divalent metal ion have a high aggregative power and through their addition in small amounts can ionically neutralize the acidic polar groups in the resin fine particles as well as the ionic surfactant present in the resin fine particle aqueous dispersions, the colorant fine particle aqueous dispersion, and the release agent fine particle aqueous dispersion. As a result, the resin fine particles, colorant fine particles, and release agent fine particles are aggregated through the effects of salting out and ion crosslinking.

The aggregating agent containing an at least divalent metal ion can be exemplified by at least divalent metal salts and by metal salt polymers. Specific examples are inorganic divalent metal salts such as calcium chloride, calcium nitrate, magnesium chloride, magnesium sulfate, and zinc chloride; trivalent metal salts such as iron(III) chloride, iron(III) sulfate, aluminum sulfate, and aluminum chloride; and inorganic metal salt polymers such as polyaluminum chloride, polyaluminum hydroxide, and calcium polysulfide; however, there is no limitation to the preceding. A single one of these may be used by itself or two or more may be used in combination.

The aggregating agent may be added in the form of the dry powder or in the form of the aqueous solution prepared by dissolution in an aqueous medium; however, addition in the form of the aqueous solution is preferred in order to bring about a uniform aggregation.

In addition, the addition and mixing of the aggregating agent is preferably carried out at a temperature at or below the glass transition temperature of the resin present in the mixture. A uniform aggregation is developed by executing mixing under this temperature condition. The aggregating agent can be mixed into the mixture using a known mixing apparatus, such as a homogenizer or a mixer.

There are no particular limitations on the average particle diameter of the aggregate particles formed in this aggregation step, but generally control is preferably exercised so as to make it about the same as the average particle diameter of the toner particle that will be ultimately obtained. The particle diameter of the aggregate particles can be readily controlled through judicious adjustment of the temperature, solids concentration, concentration of the aggregating agent, and stirring conditions.

Fusion Step

In the fusion step, an aggregation inhibitor is added, under the same stirring as in the aggregation step, to the aggregate particle-containing dispersion provided by the aggregation step. This aggregation inhibitor can be exemplified by basic compounds that shift the equilibrium for the acidic polar groups in the resin fine particles to the dissociation side and thereby stabilize the aggregate particles, and by chelating agents that stabilize the aggregate particles through the partial dissociation of the ion crosslinks between the acidic polar groups in the resin fine particles and the metal ion aggregating agent, with the formation of coordination bonds with the metal ion. Chelating agents, which have the greater aggregation-inhibiting effect, are preferred therebetween.

After the state of dispersion of the aggregate particles in the dispersion has been stabilized by the action of the aggregation inhibitor, fusion of the aggregate particles is performed by heating to at least the glass transition temperature of the binder resin.

The chelating agent may be a known water-soluble chelating agent but is not otherwise particularly limited. Specific examples are oxycarboxylic acids such as tartaric acid, citric acid, and gluconic acid and their sodium salts, as well as iminodiacetic acid (IDA), nitrilotriacetic acid (NTA), and ethylenediaminetetraacetic acid (EDTA) and their sodium salts.

By coordinating to the metal ion of the aggregating agent present in the dispersion of the aggregate particles, the chelating agent can convert the environment in this dispersion from an electrostatically unstable, readily aggregative state to an electrostatically stable state in which additional aggregation is suppressed. As a consequence of this, additional aggregation of the aggregate particles in the dispersion can be suppressed and the aggregate particles can be stabilized.

This chelating agent is preferably an organic metal salt that has at least tribasic carboxylic acid because such a chelating agent is effective even at small amounts of addition and also provides a toner particle having a sharp particle size distribution.

Viewed from the perspective of having the washing efficiency coexist with stabilization from the aggregated state, the quantity of addition for the chelating agent, expressed per 100 mass parts of the resin particles, is preferably from 1 mass part to 30 mass parts and is more preferably from 2.5 mass parts to 15 mass parts.

The prescribed circularity is achieved by carrying out the fusion step, and by cooling to a temperature that is not higher than the glass transition temperature of the binder resin, it is possible to obtain heteromorphic particles that are not spherical.

Shell Formation Step

The shell formation step is a step in which prescribed resin fine particles are attached to particles following the aggregation step or particles following the fusion step, which serve as core particles, so as to cover the core particles. Here, the styrene-acrylic resin is used as the shell, but it is possible to form a shell from another binder resin and then form a further shell from the styrene-acrylic resin.

Case Where Shell Formation Step is Added After Aggregation Step

A styrene-acrylic resin-dispersed aqueous solution is added to aggregated particles formed in the aggregation step. The addition method is not particularly limited, and the solution may be added all at once or divided into portions and added separately. In addition, in cases where the amount of a flocculant is insufficient, the flocculant may be added separately, may be added before, during or after addition of the styrene-acrylic resin-dispersed aqueous solution, and may be added multiple times.

Following shell formation, core-shell particles are obtained by carrying out the fusion step.

Case Where Shell Formation Step is Added After Fusion Step

A styrene-acrylic resin-dispersed aqueous solution is added to particles obtained in the fusion step. This addition may be carried out following cooling. The addition method is not particularly limited, and the solution may be added all at once or divided into portions and added separately.

Next, a flocculant is added if necessary, and the styrene-acrylic resin is attached to the fused particles. Core-shell particles are then obtained by carrying out the fusion step.

Toner particles can then be obtained by washing, filtration, drying, and so forth of the particles yielded by the fusion treatment.

The resulting toner particles may be used as such as toner. The following may be added on an optional basis to the toner particles in the dry state with the application of shear force: inorganic fine particles, e.g., of silica, alumina, titania, calcium carbonate, and so forth; and/or resin fine particles, e.g., of vinyl resin, polyester resin, silicone resin, and so forth. These inorganic fine particles and resin fine particles function as external additives, e.g., flowability auxiliaries, cleaning auxiliaries, and so forth.

Explanations will now be given of methods for measuring a variety of physical properties of the toner and raw materials.

Measurement of Glass Transition Temperature (Tg) of Resin

The glass transition temperature of the resin is measured in accordance with ASTM D3418-82 using a differential scanning calorimeter "Q2000" (available from TA Instruments).

Temperature calibration of the detector in the apparatus is performed using the melting points of indium and zinc, and heat amount calibration is performed using the heat of fusion of indium.

Specifically, approximately 5 mg of the resin is precisely weighed out and placed in an aluminum pan, an empty aluminum pan is used as a reference, and measurements are carried out within a measurement temperature range of from 30° C. to 180° C., at a temperature increase rate of 10° C./min.

The temperature is once increased to 180° C., held for 10 minutes, then lowered to 30° C., and then increased again. A change in specific heat is determined within the temperature range of from 30° C. to 100° C. in this second temperature increase step. Here, the temperature at a point of intersection between a straight line at an equal distance in the vertical axis direction from a straight line obtained by extending the baseline before and after a change in specific heat and a curve of a part where the glass transition temperature on a DSC curve changes in a stepwise manner is taken to be the glass transition temperature (Tg: ° C.) of the resin.

Measurement of Softening Temperature (Tm) of Resin

The softening temperature (Tm) of the amorphous resin can be measured using a "Flowtester CFT-500D Flow Property Evaluation Instrument" (Shimadzu Corporation), which is a constant-load extrusion-type capillary rheometer.

The CFT-500D is an instrument in which, while a constant load is applied by a piston from the top, the measurement sample filled in a cylinder is heated and melted and is extruded from a capillary orifice at the bottom of the cylinder and during this process a flow curve is graphed from the piston stroke (mm) and the temperature (° C.).

The "melting temperature by the ½ method", as described in the manual provided with the "Flowtester CFT-500D Flow Property Evaluation Instrument", is used as the softening temperature (Tm) in the present invention.

The melting temperature by the ½ method is determined as follows.

First, ½ of the difference between the piston stroke at the completion of outflow (outflow completion point, designated as Smax) and the piston stroke at the start of outflow (lowest point, designated as Smin) is determined (this is designated as X, where X=(Smax−Smin)/2). The temperature of the flow curve when the piston stroke reaches the sum of X and Smin is taken to be the melting temperature by the ½ method.

The measurement sample used is prepared by subjecting 1.2 g of the resin to compression molding for 60 seconds at 10 MPa in a 25° C. environment using a tablet compression molder (for example, the NT-100H Standard Manual Newton Press, NPa System Co., Ltd.) to provide a cylindrical shape with a diameter of 8 mm.

The specific measurement procedure is carried out according to the manual provided with the instrument.

The measurement conditions with the CFT-500D are as follows.
test mode: ramp-up method
start temperature: 60° C.
saturated temperature: 200° C.
measurement interval: 1.0° C.
ramp rate: 4.0° C./min
piston cross section area: 1.000 cm$^2$
test load (piston load): 5.0 kgf
preheating time: 300 seconds
diameter of die orifice: 1.0 mm
die length: 1.0 mm Measurement of Peak Temperature of Endothermic Peak (Melting Point)

The peak top temperature of the maximum endothermic peak for a resin such as the styrene-acrylic resin is measured in accordance with ASTM D3418-82 using a differential scanning calorimetry apparatus "Q1000" (available from TA Instruments).

Temperature calibration of the detector in the apparatus is performed using the melting points of indium and zinc, and heat amount calibration is performed using the heat of fusion of indium.

Specifically, approximately 5 mg of a sample is precisely weighed out and placed in a silver pan, and then subjected to a single measurement. An empty silver pan is used as a reference. Measurement conditions are as follows.
Temperature increase rate: 10° C./min
Measurement start temperature: 20° C.
Measurement end temperature: 180° C.

In cases where a toner is used as a sample, if the endothermic peak of the styrene-acrylic resin does not overlap the endothermic peak of a wax or the like, the obtained maximum endothermic peak can be used as-is.

However, in cases where a toner is used as a sample, differentiation between the endothermic peak of styrene-acrylic resin, the endothermic peak of a wax and the endothermic peak of a crystalline resin is carried out by subjecting the styrene-acrylic resin in isolation, which is obtained by extracting the styrene-acrylic resin and the wax from the toner by means of Soxhlet extraction using a hexane solvent and then Soxhlet extraction using a THF solvent, to differential scanning calorimetry measurements using the method described above, and the obtained endothermic peak is compared with endothermic peaks of components extracted using hexane and the endothermic peak of the toner.

Moreover, in cases where there are multiple peaks, the maximum endothermic peak is taken to be the peak for which the endothermic quantity is greatest. In addition, the peak temperature of the maximum endothermic peak is taken to be the melting point.

Measurement of Melting Point of Styrene-Acrylic Segment from Toner

The melting point of the styrene-acrylic segment can be measured from the toner using the method described below. In the method described below, the styrene-acrylic resin is separated from the toner and subjected to DSC measurements, after which a plurality of melting points are confirmed. Of the plurality of confirmed melting points, that derived from the styrene-acrylic segment is identified by means of NMR. NMR conditions can be, for example, those described below.

Measurement of Weight Average Molecular Weight (Mw)

The molecular weight distribution of the styrene-acrylic resin, the binder resin, and the like, is measured in the manner described below by means of gel permeation chromatography (GPC).

First, a sample is placed in tetrahydrofuran (THF) and allowed to stand for several hours at 25° C., then vigorously shaken so as to thoroughly mix the sample with the THF, then allowed to stand until no sample agglomerates remain, and then allowed to stand for a further 12 hours or longer.

Here, the length of time for which the sample is allowed to stand in the THF is set to be 24 hours. Next, a GPC sample is obtained by passing the obtained solution through a sample treatment filter (pore size from 0.2 μm to 0.5 μm; for example, a Mishoridisk H-25-2 available from Tosoh Corporation).

In addition, the sample concentration is adjusted to from 0.5 mg/mL to 5.0 mg/mL. Measurements are carried out using this sample solution under the following conditions.

A column is stabilized in a heat chamber at 40° C., the column is flushed at this temperature using tetrahydrofuran (THF) as a solvent at a flow rate of 1 mL/min, approximately 100 μL of a THF sample solution is injected, and measurements are then carried out.

A combination of multiple commercially available polystyrene gel columns are used as columns. A combination of Shodex GPC KF-801, 802, 803, 804, 805, 806, 807 and 800P available from Showa Denko K.K. or a combination of TSKgel G1000H ($H_{XL}$), G2000H ($H_{XL}$), G3000H ($H_{XL}$), G4000H ($H_{XL}$), G5000H ($H_{XL}$), G6000H ($H_{XL}$), G7000H ($H_{XL}$) and TSKguard column available from Tosoh Corporation are used.

When measuring the molecular weight of the sample, the molecular weight distribution of the sample is calculated from the relationship between count and logarithmic values on a calibration curve prepared using a plurality of monodispersed polystyrene standard samples.

Samples having molecular weights of approximately $1\times10^2$ to $1\times10^7$ available from, for example, Tosoh Corporation or Showa Denko K.K. are used as standard polystyrene samples for preparing calibration curves, and at least 10 standard polystyrene samples are used. Moreover, the detector is a RI (refractive index) detector.

Method for Measuring Value of Z Determined from Formula (2) Using FT-IR-ATR Method The ratio of the styrene-acrylic resin relative to the binder resin close to the toner surface and in the inner part of the toner is determined by carrying out measurements by means of a FT-IR-ATR method using germanium (hereinafter abbreviated to Ge) and diamond (hereinafter abbreviated to Dy) as ATR crystals.

For Ge, data can be measured at a depth of several hundred nanometers from the toner surface, and for Dy, data can be obtained at a depth of up to approximately 1 μm from the toner surface, and the abundance ratio close to the toner surface and in the inner part of the toner can therefore be calculated from the measured intensity ratio for Ge and Dy. By comparing the characteristic peak intensities of the binder resin and the styrene-acrylic resin measured under the conditions described below, it is possible to determine the constituent ratio of the binder resin and the styrene-acrylic resin.

FT-IR spectra obtained using an ATR method were obtained using a Spectrum One (Fourier transform infrared spectroscopy analyzer available from PerkinElmer) equipped with a Universal ATR Sampling Accessory.

The infrared light incident angle was set to 45°.

A Ge ATR crystal (refractive index=4.0) and a Dy ATR crystal (refractive index=2.4) were used as ATR crystals.

Other conditions are as follows.
Range
Start: 4000 $cm^{-1}$
End: 600 $cm^{-1}$ (Ge ATR crystal)
Duration
Scan number: 4
Resolution: 4.00 $cm^{-1}$
Advanced: $CO_2/H_2O$ correction carried out For example, the ratio of the styrene-acrylic resin relative to the binder resin in a surface layer of toner 1 in Example 1 was determined using the following procedure. Toner 1 contains amorphous polyester resins (L1 and H1) and styrene-acrylic resin A1.

Amorphous polyester resins (L1 and H1) have a peak derived from an aromatic ring between 820 $cm^{-1}$ and 840 $cm^{-1}$, and styrene-acrylic resin A1 has a peak derived from $CH_3$ in acrylic acid between 2840 $cm^{-1}$ and 2860 cm', and calculations can therefore be carried out using the procedure described below.

Method for Calculating Peaks (Ge-r and Dy-r) of Amorphous Polyester Resins (L1 and H1) and Peaks (Ge-a and Dy-a) of Styrene-acrylic Resin A1

(1) A Ge ATR crystal (refractive index=4.0) is attached to an apparatus.
(2) Scan type is set to Background, Units are set to EGY, and background measurements are carried out.
(3) Scan type is set to Sample, and Units are set to A.
(4) 0.01 g of a toner is precisely weighed out onto the ATR crystal.
(5) The sample is pressurized using a pressurizing arm (Force Gauge=100).
(6) The sample is measured.
(7) The obtained FT-IR spectrum is subjected to baseline correction using Automatic Correction.
(8) The maximum value of endothermic peak intensity within the range from 820 $cm^{-1}$ to 840 $cm^{-1}$ is calculated (Ge-r1).
(9) The average value of endothermic peak intensity at 790 $cm^{-1}$ and at 860 $cm^{-1}$ is calculated (Ge-r2).
(10) The value of (Ge-r1)-(Ge-r2) is taken to be Ge-r.
Ge-r=maximum endothermic peak intensity within the range from 820 $cm^{-1}$ to 840 $cm^{-1}$
(11) The maximum value of endothermic peak intensity within the range from 2840 $cm^{-1}$ to 2860 $cm^{-1}$ is calculated (Ge-a1).
(12) The average value of endothermic peak intensity at 2600 $cm^{-1}$ and at 3100 $cm^{-1}$ is calculated (Ge-a2).
(13) The value of (Ge-a1)-(Ge-a2) is taken to be Ge-a.
Ge-a=maximum endothermic peak intensity within the range from 2840 $cm^{-1}$ to 2860 $cm^{-1}$
(14) A Dy ATR crystal (refractive index=4.0) is attached to an apparatus.
(15) Dy-r and Dy-a are calculated using the same procedure as that described in steps (2) to (13) above.
(16) The value of Z is calculated from the obtained values using formula (2).

$$Z=(Ge\text{-}a/Ge\text{-}r)/(Dy\text{-}a/Dy\text{-}r) \qquad (2)$$

The abundance ratio of styrene-acrylic resin A1 relative to the binder resin close to the toner surface is determined from the ratio of Ge-a and Ge-r, which are calculated by carrying out measurements using Ge, and the abundance ratio of styrene-acrylic resin A1 relative to the binder resin in the inner part of the toner is determined from the ratio of Dy-a and Dy-r, which are calculated by carrying out measurements using Dy. Furthermore, the proportion of styrene-acrylic resin A1, which is localized close to the toner surface, can be calculated from the abundance ratio close to the toner surface and the abundance ratio in the inner part of the toner.

Measurement of Number-based Median Diameter (D50) of Toner Particles

The median diameter (D50) of the toner particle is determined by carrying out the measurements in 25,000 channels for the number of effective measurement channels and performing analysis of the measurement data, using a "Coulter Counter Multisizer 3" (registered trademark, Beckman Coulter, Inc.), a precision particle size distribution measurement instrument operating on the pore electrical resistance method and equipped with a 100-μm aperture tube, and using the accompanying dedicated software, i.e., "Beckman Coulter Multisizer 3 Version 3.51" (Beckman Coulter, Inc.), to set the measurement conditions and analyze the measurement data.

The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used.

The dedicated software is configured as follows prior to measurement and analysis.

In the "modify the standard operating method (SOM)" screen in the dedicated software, the total count number in the control mode is set to 50000 particles; the number of measurements is set to 1 time; and the Kd value is set to the value obtained using "standard particle 10.0 μm" (Beckman Coulter, Inc.). The threshold value and noise level are automatically set by pressing the threshold value/noise level measurement button. In addition, the current is set to 1,600 μA; the gain is set to 2; the electrolyte solution is set to ISOTON II; and a check is entered for the post-measurement aperture tube flush.

In the "setting conversion from pulses to particle diameter" screen of the dedicated software, the bin interval is set to logarithmic particle diameter; the particle diameter bin is set to 256 particle diameter bins; and the particle diameter range is set to from 1 μm to 30 μm.

The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) Approximately 30 mL of the aqueous electrolyte solution is introduced into a 100-mL flatbottom glass beaker. To this is added approximately 0.3 mL of the dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) as a dispersing agent.

(3) A prescribed amount of deionized water is introduced into the water tank of the ultrasound disperser "Ultrasonic Dispersion System Tetora 150" (Nikkaki Bios Co., Ltd.), which has an electrical output of 120 W and is equipped with two oscillators (oscillation frequency=50 kHz) disposed such that the phases are displaced by 180°, and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner particle is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the dispersed toner-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50000.

(7) The measurement data is analyzed by the dedicated software provided with the instrument and the median diameter (D50) is calculated. When set to graph/number % with the dedicated software, the "50% D diameter" on the analysis/number statistical value (arithmetic average) screen is the median diameter (D50).

Measurement of Content Ratio of Monomer Units Represented by Formula (1) and Styrene-Acrylic Segments in Styrene-Acrylic Resin from Toner First, the styrene-acrylic resin is isolated from the toner. Insoluble components are separated by dissolving the toner in tetrahydrofuran and then filtering. Next, hexane is added dropwise while stirring the dissolved product so as to precipitate insoluble components. By filtering and separating precipitating products, the styrene-acrylic resin dissolved in hexane is obtained. The styrene-acrylic resin is separated by distilling off the hexane under reduced pressure, and by measuring the mass of obtained styrene-acrylic resin, the content of the styrene-acrylic resin in the toner can be determined. Next, the content ratio of monomer units represented by formula (1) and styrene-acrylic segments can be measured by subjecting the isolated styrene-acrylic resin to nuclear magnetic resonance (NMR) measurements.

$^1$H NMR measurements are carried out using the method described below. A solution obtained by dissolving 5 mg of a sample in 0.5 mL of deuterated chloroform containing tetramethylsilane as a 0.00 ppm internal standard is placed in a sample tube and subjected to $^1$H NMR measurements in which the repetition time is 2.7 seconds and the number of accumulations is 16. An ECA 400 MHz available from JEOL Ltd. is used as the measurement apparatus.

By comparing the integration ratios of hydrogen in alkenyl groups derived from the hydrocarbon compound, hydrogen in styrene groups derived from the styrene-acrylic segment and hydrogen in oxygen-bonded ethylene groups shown in the monomer unit represented by formula (1), the content ratios of the monomer unit and the styrene-acrylic segment can be calculated.

Measurement of Number of Carbon Atoms in Long Chain Alkyl Side Chain in Polyester Resin in Toner The styrene-acrylic resin is precipitated with hexane in the same way as in the isolation method described above, and an insoluble component recovered through filtration is the polyester resin in the toner. The isolated polyester resin is subjected to $^1$H NMR measurements using the same method as that used for the styrene-acrylic resin above, and the number of carbon atoms is measured from a peak derived from a long chain alkyl group.

Method for Measuring Average Circularity

The average circularity of the toner particle is measured using an "FPIA-3000" (Sysmex Corporation), a flow particle image analyzer, and using the measurement and analysis conditions from the calibration process.

The specific measurement method is as follows. First, approximately 20 mL of deionized water from which solid impurities and so forth have been preliminarily removed, is introduced into a glass container. To this is added as dispersing agent approximately 0.2 mL of a dilution prepared by the approximately three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, Wako Pure Chemical Industries, Ltd.).

Approximately 0.02 g of the measurement sample is added, and a dispersion treatment is carried out for 2 minutes using an ultrasound disperser to provide a dispersion to be used for the measurement. Cooling is carried out as appropriate during this process in order to have the temperature of the dispersion be from 10° C. to 40° C. A benchtop ultrasound cleaner/disperser that has an oscillation frequency of 50 kHz and an electrical output of 150 W ("VS-150" (Velvo-Clear Co., Ltd.)) is used as the ultrasound disperser, and a prescribed amount of deionized water is introduced into its water tank and approximately 2 mL of Contaminon N is added to the water tank.

The previously cited flow particle image analyzer fitted with an objective lens (10×) is used for the measurement, and "PSE-900A" (Sysmex Corporation) particle sheath is used for the sheath solution. The dispersion prepared according to the procedure described above is introduced into the flow particle image analyzer and 3000 toner particles are measured according to total count mode in HPF measurement mode. The average circularity of the toner particle is determined with the binarization threshold value during particle analysis set at 85% and the analyzed particle diameter limited to a circle-equivalent diameter of from 1.985 μm to 39.69 μm.

For this measurement, automatic focal point adjustment is performed prior to the start of the measurement using reference latex particles (a dilution with deionized water of "RESEARCH AND TEST PARTICLES Latex Microsphere Suspensions 5200A", Duke Scientific Corporation). After this, focal point adjustment is preferably performed every two hours after the start of measurement.

In the examples in the present application, the flow particle image analyzer used had been calibrated by the Sysmex Corporation and had been issued a calibration certificate by the Sysmex Corporation. The measurements were carried out under the same measurement and analysis conditions as when the calibration certification was received, with the exception that the analyzed particle diameter was limited to a circle-equivalent diameter of from 1.985 μm to 39.69 μm.

EXAMPLES

The present invention will now be explained in further detail by means of production examples and Examples, but these examples in no way limit the present invention. Moreover, parts and percentages in the formulations below are based on mass, unless explicitly stated otherwise.

Production Example of Styrene-Acrylic Resin A1

300.0 parts of xylene and 15.0 parts of polypropylene (having a melting point of 75° C.) are placed in an autoclave reaction vessel equipped with a temperature gauge and a stirrer and thoroughly dissolved, the reaction vessel is purged with nitrogen, a mixed solution comprising 15.0 parts of styrene, 45.0 parts of behenyl acrylate and 250.0 parts of xylene is then added dropwise over a period of 3 hours at a temperature of 180° C., and polymerization is carried out. Styrene-acrylic resin A1 was then obtained by maintaining this temperature for 30 minutes and carrying out solvent removal. The composition of the obtained styrene-acrylic resin is shown in Table 1.

Production Examples of Styrene-Acrylic Resins A2 to A11

Styrene-acrylic resins A2 to A11 were all obtained by carrying out the same procedure as that in the production example of styrene-acrylic resin A1, except that conditions in the production example of styrene-acrylic resin A1, such as the type of aliphatic hydrocarbon compound shown in Table 1, the type of acrylic acid ester, the mass percentage of the monomer unit represented by formula (1) and the mass percentage of the styrene-acrylic segment in the styrene-acrylic resin, were altered as appropriate. The compositions of the obtained styrene-acrylic resins are shown in Table 1.

TABLE 1

| | Compound composition | | | | | |
|---|---|---|---|---|---|---|
| | Aliphatic hydrocarbon compound | | Crystalline styrene-acrylic segment | | | |
| | | | Acrylic acid ester | | | |
| | | | | Ratio of | | |
| Styren-acrylic resin No. | Type | Melting point | Structure | formula (1) Mass % | Melting point | Content Mass % |
| A1 | Polypropylene | 75° C. | Behenyl acrylate | 60% | 46° C. | 80% |
| A2 | Polypropylene | 75° C. | Stearyl acrylate | 60% | 30° C. | 80% |
| A3 | Polypropylene | 75° C. | Octacosyl acrylate | 60% | 71° C. | 80% |
| A4 | Polypropylene | 75° C. | Behenyl acrylate | 30% | 46° C. | 80% |
| A5 | Polypropylene | 75° C. | Behenyl acrylate | 80% | 46° C. | 80% |
| A6 | Polypropylene | 75° C. | Behenyl acrylate | 60% | 46° C. | 70% |
| A7 | Polypropylene | 75° C. | Behenyl acrylate | 60% | 46° C. | 95% |
| A8 | Polypropylene | 75° C. | Behenyl methacrylate | 60% | 44° C. | 80% |
| A9 | Paraffin wax | 75° C. | Behenyl acrylate | 60% | 46° C. | 80% |
| A10 | Polypropylene | 75° C. | Palmityl acrylate | 60% | 22° C. | 80% |
| A11 | Polypropylene | 75° C. | Dotriacontyl acrylate | 60% | 83° C. | 80% |

In the table, "Ratio of formula (1)" indicates the content ratio of monomer units represented by formula (1) in the styrene-acrylic resin.

Production Examples of Amorphous Polyester Resins
Production Example of Low Molecular Weight Amorphous Polyester Resin (L)

Polyoxypropylene(2.8)-2,2-bis(4-hydroxyphenyl)propane: 76.6 parts
(0.17 moles; 100.0 mol % relative to the total number of moles of polyhydric alcohol)
Terephthalic acid: 17.4 parts
(0.10 moles; 72.0 mol % relative to the total number of moles of polycarboxylic acid)
Adipic acid: 6.0 parts
(0.04 moles; 28.0 mol % relative to the total number of moles of polycarboxylic acid)
Titanium tetrabutoxide (esterification catalyst): 0.5 parts The materials listed above were weighed out into a reaction vessel equipped with a condenser tube, a stirrer, a nitrogen inlet tube and a thermocouple.

Next, the reaction vessel was purged with nitrogen gas, the temperature was gradually increased while stirring the contents of the reaction vessel, and a reaction was allowed to progress for 4 hours while stirring the contents of the reaction vessel at a temperature of 200° C.

Next, the pressure inside the reaction vessel was lowered to 8.3 kPa and held at this pressure for 1 hour, after which the contents of the reaction vessel were cooled to a temperature of 180° C. and the reaction vessel was allowed to return to atmospheric pressure (a first reaction step).

Tert-butylcatechol (polymerization inhibitor): 0.1 parts

Next, the material mentioned above was added, the pressure inside the reaction vessel was lowered to 8.3 kPa, a reaction was allowed to progress for 1 hour while maintaining a temperature of 180° C., and once it had been confirmed that the softening point, as measured in accordance with ASTM D36-86, had reached 90° C., the temperature was lowered and the reaction was terminated (a second reaction step), thereby obtaining amorphous polyester resin (L1).

The obtained amorphous polyester resin (L) had a peak molecular weight (Mp) of 7300, a softening point (Tm) of 90° C. and a glass transition temperature (Tg) of 52° C.

Production Example of High Molecular Weight Amorphous Polyester Resin (H1)

Polyoxyethylene(2.2)-2,2-bis(4-hydroxyphenyl)propane: 72.2 parts
(0.20 moles; 100.0 mol % relative to the total number of moles of polyhydric alcohol)
Terephthalic acid: 13.2 parts
(0.08 moles; 48.0 mol % relative to the total number of moles of polycarboxylic acid)
Adipic acid: 8.2 parts
(0.06 moles; 34.0 mol % relative to the total number of moles of polycarboxylic acid)
Titanium tetrabutoxide (esterification catalyst): 0.5 parts The materials listed above were weighed out into a reaction vessel equipped with a condenser tube, a stirrer, a nitrogen inlet tube and a thermocouple.

Next, the reaction vessel was purged with nitrogen gas, the temperature was gradually increased while stirring the contents of the reaction vessel, and a reaction was allowed to progress for 2 hours while stirring the contents of the reaction vessel at a temperature of 200° C.

Next, the pressure inside the reaction vessel was lowered to 8.3 kPa and held at this pressure for 1 hour, after which the contents of the reaction vessel were cooled to a temperature of 160° C. and the reaction vessel was allowed to return to atmospheric pressure (a first reaction step).

Trimellitic acid: 6.3 parts
(0.03 moles; 18.0 mol % relative to the total number of moles of polycarboxylic acid)
Tert-butylcatechol (polymerization inhibitor): 0.1 parts Next, the materials listed above were added, the pressure inside the reaction vessel was lowered to 8.3 kPa, a reaction was allowed to progress for 15 hours while maintaining a temperature of 160° C., and once it had been confirmed that the softening point, as measured in accordance with ASTM D36-86, had reached 140° C., the temperature was lowered and the reaction was terminated (a second reaction step), thereby obtaining amorphous polyester resin (H1).

The obtained amorphous polyester resin (H1) had a peak molecular weight (Mp) of 9000, a softening point (Tm) of 142° C. and a glass transition temperature (Tg) of 57° C.

Production Example of High Molecular Weight Amorphous Polyester Resin (H2)

Amorphous polyester resin (H2) was obtained in a similar way, except that the constituent composition (mol %) of the amorphous polyester resin (H1) was changed so that polyoxypropylene (2.2)-2,2-bis(4-hydroxyphenyl)propane:polyoxyethylene (2.0)-2,2-bis(4-hydroxyphenyl)propane:terephthalicacid:dodecylsuccinicacid:trimellitic acid=33:17:24:20:6.

The obtained amorphous polyester resin (H2) had a peak molecular weight (Mp) of 8500, a softening point (Tm) of 120° C. and a glass transition temperature (Tg) of 56° C.

Example 1

Production of Toner 1: Melt Kneading Method Including Heat Treatment Step

Low molecular weight amorphous polyester resin (L1): 70.0 parts
High molecular weight amorphous polyester resin (H1): 30.0 parts
Styrene-acrylic resin A1: 20.0 parts
Fischer-Tropsch wax: 5.0 parts
(hydrocarbon wax, maximum endothermic peak temperature: 90° C.)
C.I. Pigment Blue 15:3: 7.0 parts
Aluminum 3,5-di-t-butylsalicylate compound: 0.3 parts
(Bontron E101, available from Orient Chemical Industries Co., Ltd.)

Using a Henschel mixer (FM-75 model, available from Mitsui Kozan Kabushiki Kaisha), the materials listed above were mixed at a rotational speed of 20 $s^{-1}$ for a period of 5 minutes, and then melted and kneaded using a twin screw kneader (PCM-30 model, available from Ikegai Corporation) at a temperature of 150° C. The obtained melt-kneaded product was cooled and then coarsely pulverized to a size of 1 mm or less using a hammer mill so as to obtain a coarsely pulverized product. The obtained coarsely pulverized product was then finely pulverized using a mechanical pulverizer (T-250, available from Turbo Kogyo).

Resin particle 1 was then obtained by classifying the finely pulverized product using a Faculty F-300 (available from Hosokawa Micron Corporation). Operating conditions for the Faculty F-300 were such that the rotational speed of a classifying rotor was 130 $s^{-1}$ and the rotational speed of a dispersing rotor was 70 $s^{-1}$.

Toner particle 1 was obtained by heat treating the obtained resin particle 1 using the heat treatment apparatus shown in the FIGURE. Operating conditions were a feed amount of 5 kg/hr, a hot air current temperature of 180° C., a hot air current flow rate of 6 $m^3$/min, a cold air current temperature of −5° C., a cold air current flow rate of 4 m³/min, a blower flow rate of 20 m³/min and an injection air flow rate of 1 m³/min.

Toner 1 was obtained by mixing 100 parts of toner particle 1 with 1.0 parts of hydrophobic silica (BET specific surface area: 200 m²/g) and 1.0 parts of titanium oxide fine particles (BET specific surface area: 80 m²/g), which had been surface treated with isobutyltrimethoxysilane, for 10 minutes at a rotational speed of 30 s⁻¹ using a Henschel mixer (FM-75 model, available from Mitsui Kozan Kabushiki Kaisha).

When measured using a FT-IR ATR method, the obtained toner 1 had a value of Z, as shown in formula (2), of 7.0.

Example 2

Production of Toner 2

Toner 2 was obtained in the same way as in the production example of toner 1, except that styrene-acrylic resin A2 was used instead of styrene-acrylic resin A1.

When measured using a FT-IR ATR method, the obtained toner 2 had a value of Z, as shown in formula (2), of 7.0.

Example 3

Production of Toner 3

Toner 3 was obtained in the same way as in the production example of toner 1, except that styrene-acrylic resin A3 was used instead of styrene-acrylic resin A1.

When measured using a FT-IR ATR method, the obtained toner 3 had a value of Z, as shown in formula (2), of 7.0.

Example 4

Production of Toner 4

Toner 4 was obtained in the same way as in the production example of toner 1, except that the amount of styrene-acrylic resin A1 was changed to 10.0 parts.

When measured using a FT-IR ATR method, the obtained toner 4 had a value of Z, as shown in formula (2), of 1.5.

Example 5

Production of Toner 5

Toner 5 was obtained in the same way as in the production example of toner 1, except that the amount of styrene-acrylic resin A1 was changed to 30.0 parts.

When measured using a FT-IR ATR method, the obtained toner 5 had a value of Z, as shown in formula (2), of 9.0.

Example 6

Production of Toner 6

Toner 6 was obtained in the same way as in the production example of toner 1, except that the rotational speed of the dispersing rotor in the faculty was changed to 100 s⁻¹ and the hot air current temperature in the heat treatment apparatus was changed to 150° C.

When measured using a FT-IR ATR method, the obtained toner 6 had a value of Z, as shown in formula (2), of 5.0.

Example 7

Production of Toner 7

Toner 7 was obtained in the same way as in the production example of toner 1, except that styrene-acrylic resin A4 was used instead of styrene-acrylic resin A1.

When measured using a FT-IR ATR method, the obtained toner 7 had a value of Z, as shown in formula (2), of 7.0.

Example 8

Production of Toner 8

Toner 8 was obtained in the same way as in the production example of toner 1, except that styrene-acrylic resin A5 was used instead of styrene-acrylic resin A1.

When measured using a FT-IR ATR method, the obtained toner 8 had a value of Z, as shown in formula (2), of 7.0.

Example 9

Production of Toner 9

Toner 9 was obtained in the same way as in the production example of toner 1, except that styrene-acrylic resin A6 was used instead of styrene-acrylic resin A1.

When measured using a FT-IR ATR method, the obtained toner 9 had a value of Z, as shown in formula (2), of 7.0.

Example 10

Production of Toner 10

Toner 10 was obtained in the same way as in the production example of toner 1, except that styrene-acrylic resin A7 was used instead of styrene-acrylic resin A1.

When measured using a FT-IR ATR method, the obtained toner 10 had a value of Z, as shown in formula (2), of 7.0.

Example 11

Production of Toner 11

Toner 11 was obtained in the same way as in the production example of toner 1, except that styrene-acrylic resin A8 was used instead of styrene-acrylic resin A1.

When measured using a FT-IR ATR method, the obtained toner 11 had a value of Z, as shown in formula (2), of 7.0.

Example 12

Production of Toner 12

Toner 12 was obtained in the same way as in the production example of toner 1, except that amorphous polyester resin (H2) was used instead of high molecular weight amorphous polyester resin (H1).

When measured using a FT-IR ATR method, the obtained toner 12 had a value of Z, as shown in formula (2), of 7.0.

Example 13

Production of Toner 13

Toner 13 was obtained in the same way as in the production example of toner 1, except that styrene-acrylic resin A9 was used instead of styrene-acrylic resin A1.

When measured using a FT-IR ATR method, the obtained toner 13 had a value of Z, as shown in formula (2), of 7.0.

Example 14

Production of Toner 14: Emulsion Aggregation Method
Production of Amorphous Polyester Resin-Dispersed Solution
Tetrahydrofuran (available from Wako Pure Chemical Industries, Ltd.): 200 parts
Low molecular weight amorphous polyester resin (L1): 84 parts High molecular weight amorphous polyester resin (H1): 36 parts
Anionic surfactant (Neogen RK available from DKS Co. Ltd.): 0.6 parts The resins were dissolved by mixing the components listed above and then stirring for 12 hours.

Next, 2.7 parts of N,N-dimethylaminoethanol was added and stirred at 4000 rpm using a T. K. Robomix ultrahigh speed stirrer (available from Primix Corporation).

360 parts of ion exchanged water was then added at a rate of 1 g/min so as to precipitate amorphous resin fine particles. An amorphous polyester resin-dispersed solution was then obtained by removing the tetrahydrofuran using an evaporator. The volume average particle diameter (D50) of amorphous polyester resin particles in the amorphous polyester resin-dispersed solution was 0.11 µm.

Production of Styrene-Acrylic Resin-Dispersed Solution
Styrene-acrylic resin A1: 20.0 parts
Anionic surfactant (Neogen RK available from DKS Co. Ltd.): 1.0 parts
Ion exchanged water: 79.0 parts The components listed above were placed in a mixing vessel equipped with a stirring device, heated to 90° C. and subjected to dispersion treatment for 60 minutes by being circulated in a Clearmix W-Motion (available from M Technique Co., Ltd.). The dispersion treatment conditions were as follows.

Outer diameter of rotor: 3 cm
Clearance: 0.3 mm
Rotational speed of rotor: 19000 r/min
Rotational speed of screen: 19000 r/min Following the dispersion treatment, an aqueous dispersion containing 20 mass % of styrene-acrylic resin A1 (a styrene-acrylic resin-dispersed solution) was obtained by cooling to 40° C. at a rotor rotational speed of 1000 r/min, a screen rotational speed of 0 r/min and a cooling rate of 10° C./min. The volume average particle diameter (D50) of styrene-acrylic resin particles in the obtained styrene-acrylic resin-dispersed solution was 0.23 µm.

Production of Colorant-Dispersed Solution
C.I. Pigment Blue 15:3: 100 parts
Anionic surfactant: 10 parts
Ion exchanged water: 890 parts The components listed above were mixed, dissolved, and then dispersed using a high pressure impact disperser.

The volume average particle diameter (D50) of colorant particles in the obtained colorant-dispersed solution was 0.16 µm.

Production of Wax-Dispersed Solution
Fischer-Tropsch wax: 100 parts
(hydrocarbon wax, maximum endothermic peak temperature: 90° C.)
Anionic surfactant: 10 parts
Ion exchanged water: 390 parts The components listed above were heated to 95° C., dispersed using a homogenizer, and then dispersed using a pressure discharge-type Gaulin homogenizer, thereby obtaining a wax-dispersed solution. The volume average particle diameter (D50) of wax particles in the obtained wax-dispersed solution was 0.21 µm.

Aggregation Fusion Step
Amorphous polyester resin-dispersed solution: 333 parts
Colorant-dispersed solution: 50 parts
Wax-dispersed solution: 50 parts
Ion exchanged water: 400 parts The materials listed above were placed in a round stainless steel flask and mixed, after which an aqueous solution obtained by dissolving 2 parts of magnesium sulfate in 98 parts of ion exchanged water was added to the flask, and the obtained mixed solution was dispersed for 10 minutes at 5000 rpm using a homogenizer (an ULTRA-TURRAX T50 available from IKA).

The mixed solution was then heated to 58° C. in a heating water bath while appropriately adjusting the speed of rotation of a stirring blade so that the mixed solution was stirred. Aggregated particles having a volume average particle diameter of approximately 5.0 µm were obtained by maintaining a temperature of 50° C. for 1 hour.

An aqueous solution obtained by dissolving 20 parts of trisodium citrate in 380 parts of ion exchanged water was added to a dispersed solution containing the aggregated particles and heated to 85° C.

Fused particles (core particles) having a number-based median diameter of approximately 4.0 µm and an average circularity of 0.966 were obtained by maintaining a temperature of 85° C. for 2 hours.

Moreover, the volume average particle diameter of the particles was measured using a Coulter Multisizer III (available from Beckman Coulter, Inc), in accordance with the operation manual of this apparatus. In addition, average circularity was calculated by carrying out measurements using a flow particle image analyzer "FPIA-3000" (available from Sysmex Corporation), in accordance with the operation manual of this apparatus.

The obtained toner particle-dispersed aqueous solution was cooled to 25° C. while being stirred, 22 parts of a styrene-acrylic resin-dispersed solution was added, and stirring was carried out for 10 minutes at 25° C. A 2 mass % aqueous solution of calcium chloride was then gradually added dropwise. In this state, a small amount of the solution was extracted at an appropriate time and passed through a 2 µm microfilter, and the stirring was continued at 25° C. until the filtrate became transparent.

After it was confirmed that the filtrate was transparent, another 22 parts of the styrene-acrylic resin-dispersed solution was added and the stirring was continued. After it was confirmed again that the filtrate was transparent, another 23 parts of the styrene-acrylic resin-dispersed solution was added and the stirring was continued. After it was confirmed that the filtrate was transparent, the solution was heated to 85° C. while adjusting the speed of rotation as appropriate. During this process, the particle diameter was confirmed at an appropriate time, and if the particle diameter had increased, a 5 mass % aqueous solution of sodium ethylenediamine tetraacetate was added so as to prevent aggregation from occurring.

A toner particle-dispersed solution (a core-shell type particle-dispersed solution) having a number-based median diameter of approximately 5.6 µm and an average circularity of 0.968 was obtained by maintaining a temperature of 85° C. for 1 hour.

Next, the toner particle-dispersed aqueous solution was cooled to 25° C., filtered and subjected to solid-liquid separation, and the filtered solid was thoroughly washed with ion exchanged water and dried using a vacuum dryer so as to obtain toner particles having a number-based median diameter of 5.5 µm.

Toner 14 was obtained by mixing 100 parts of the toner particles with 1.0 parts of hydrophobic silica (BET specific surface area: 200 m$^2$/g) and 1.0 parts of titanium oxide fine particles (BET specific surface area: 80 m$^2$/g), which had been surface treated with isobutyltrimethoxysilane, for 10 minutes at a rotational speed of 30 s$^{-1}$ using a Henschel mixer (FM-75 model, available from Mitsui Kozan Kabushiki Kaisha).

When measured using a FT-IR ATR method, the obtained toner 14 had a value of Z, as shown in formula (2), of 9.0.

Comparative Example 1

Production of Toner 15

Toner 15 was obtained in the same way as in the production example of toner 1, except that styrene-acrylic resin A10 was used instead of styrene-acrylic resin A1.

When measured using a FT-IR ATR method, the obtained toner 15 had a value of Z, as shown in formula (2), of 7.0.

Comparative Example 2

Production of Toner 16

Toner 16 was obtained in the same way as in the production example of toner 1, except that styrene-acrylic resin A11 was used instead of styrene-acrylic resin A1.

When measured using a FT-IR ATR method, the obtained toner 16 had a value of Z, as shown in formula (2), of 7.0.

Comparative Example 3

Production of Toner 17

Toner 17 was obtained in the same way as in the production example of toner 1, except that the amount of styrene-acrylic resin A1 was changed to 8.0 parts.

When measured using a FT-IR ATR method, the obtained toner 17 had a value of Z, as shown in formula (2), of 1.3.

Comparative Example 4

Production of Toner 18

Toner 18 was obtained in the same way as in the production example of toner 1, except that the amount of styrene-acrylic resin A1 was changed to 40.0 parts.

When measured using a FT-IR ATR method, the obtained toner 18 had a value of Z, as shown in formula (2), of 10.0.

Production Example of Magnetic Core Particle 1

Step 1 (Weighing Out/Mixing Step):

$Fe_2O_3$: 62.7 parts
$MnCO_3$: 29.5 parts
$Mg(OH)_2$: 6.8 parts
$SrCO_3$: 1.0 parts Ferrite raw materials were weighed out so that the materials listed above had the compositional ratio mentioned above. Next, the materials were pulverized and mixed for 5 hours in a dry vibrating mill using stainless steel beads having diameters of ⅛ inch.

Step 2 (Calcining Step):

The obtained pulverized product was formed into pellets measuring approximately 1 mm square using a roller compactor. Coarse particles were removed from these pellets using a vibrating sieve having an opening size of 3 mm, after which fine particles were removed using a vibrating sieve having an opening size of 0.5 mm, and a calcined ferrite was then prepared by firing for 4 hours at 1000° C. in a nitrogen atmosphere (oxygen concentration: 0.01 vol %) using a burner type kiln. The composition of the obtained calcined ferrite was as follows.

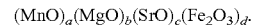

$(MnO)_a(MgO)_b(SrO)_c(Fe_2O_3)_d$.

In the formula above, a=0.257, b=0.117, c=0.007 and d=0.393.

Step 3 (Pulverization Step):

The obtained calcined ferrite was pulverized to a size of approximately 0.3 mm using a crusher, water was added in an amount of 30 parts relative to 100 parts of the calcined ferrite, and the calcined ferrite was then pulverized for 1 hour in a wet ball mill using zirconia beads having diameters of ⅛ inch. The obtained slurry was pulverized for 4 hours in a wet ball mill using alumina beads having diameters of 1/16 inch to obtain a ferrite slurry (a finely pulverized calcined ferrite).

Step 4 (Granulating Step):

1.0 parts of ammonium polycarboxylate as a dispersing agent and 2.0 parts of poly(vinyl alcohol) as a binder, each relative to 100 parts of the calcined ferrite, were added to the ferrite slurry, and the slurry was then granulated into spheri-

TABLE 2

| Example No. | Toner No. | Particle diameter D50 | Binder resin | | Styrene-acrylic resin | | |
|---|---|---|---|---|---|---|---|
| | | | Low molecular weight | High molecular weight | Type | Content (parts) | ATR ratio |
| 1 | 1 | 5.1 μm | Polyester resin L1 | Polyester resin H1 | Styrene-acrylic resin A1 | 20 | 7.0 |
| 2 | 2 | 5.3 μm | Polyester resin L1 | Polyester resin H1 | Styrene-acrylic resin A2 | 20 | 7.0 |
| 3 | 3 | 5.0 μm | Polyester resin L1 | Polyester resin H1 | Styrene-acrylic resin A3 | 20 | 7.0 |
| 4 | 4 | 5.1 μm | Polyester resin L1 | Polyester resin H1 | Styrene-acrylic resin A1 | 10 | 1.5 |
| 5 | 5 | 5.1 μm | Polyester resin L1 | Polyester resin H1 | Styrene-acrylic resin A1 | 30 | 9.0 |
| 6 | 6 | 5.0 μm | Polyester resin L1 | Polyester resin H1 | Styrene-acrylic resin A1 | 20 | 5.0 |
| 7 | 7 | 5.1 μm | Polyester resin L1 | Polyester resin H1 | Styrene-acrylic resin A4 | 20 | 7.0 |
| 8 | 8 | 5.1 μm | Polyester resin L1 | Polyester resin H1 | Styrene-acrylic resin A5 | 20 | 7.0 |
| 9 | 9 | 5.1 μm | Polyester resin L1 | Polyester resin H1 | Styrene-acrylic resin A6 | 20 | 7.0 |
| 10 | 10 | 5.1 μm | Polyester resin L1 | Polyester resin H1 | Styrene-acrylic resin A7 | 20 | 7.0 |
| 11 | 11 | 5.1 μm | Polyester resin L1 | Polyester resin H1 | Styrene-acrylic resin A8 | 20 | 7.0 |
| 12 | 12 | 5.1 μm | Polyester resin L1 | Polyester resin H2 | Styrene-acrylic resin A1 | 20 | 7.0 |
| 13 | 13 | 5.1 μm | Polyester resin L1 | Polyester resin H1 | Styrene-acrylic resin A9 | 20 | 7.0 |
| 14 | 14 | 5.5 μm | Polyester resin L1 | Polyester resin H1 | Styrene-acrylic resin A1 | 20 | 9.0 |
| C.E. 1 | 15 | 5.1 μm | Polyester resin L1 | Polyester resin H1 | Styrene-acrylic resin A10 | 20 | 7.0 |
| C.E. 2 | 16 | 5.1 μm | Polyester resin L1 | Polyester resin H1 | Styrene-acrylic resin A11 | 20 | 7.0 |
| C.E. 3 | 17 | 5.1 μm | Polyester resin L1 | Polyester resin H1 | Styrene-acrylic resin A1 | 8 | 1.3 |
| C.E. 4 | 18 | 5.1 μm | Polyester resin L1 | Polyester resin H1 | Styrene-acrylic resin A1 | 40 | 10.0 |

In the table, "C.E." denotes "Comparative Example", and the content of the styrene-acrylic resin is expressed in terms of number of parts relative to 100 parts of binder resin.

cal particles using a spray dryer (manufactured by Ohkawara Kakohki Co., Ltd.). After adjusting the diameters of the obtained particles, the particles were heated for 2 hours at 650° C. using a rotary kiln, and organic components, such as the dispersing agent and binder, were removed.

Step 5 (Firing Step):

In order to control the firing atmosphere, the temperature was increased from room temperature to 1300° C. over a period of 2 hours in a nitrogen atmosphere (oxygen concentration: 1.00 vol %) using an electric furnace, after which firing was carried out for 4 hours at a temperature of 1150° C. The temperature was then lowered to 60° C. over a period of 4 hours, the nitrogen atmosphere was allowed to return to an air atmosphere, and the fired product was taken out at a temperature of 40° C. or lower.

Step 6 (Sorting Step):

After crushing the aggregated particles, particles having a low magnetic force were removed by means of magnetic separation, coarse particles were removed by sieving with a sieve having an opening size of 250 µm so as to obtain magnetic core particles 1 having a 50% particle diameter on a volume basis (D50) of 37.0 µm.

Preparation of Coating Resin 1

Cyclohexyl methacrylate monomer: 26.8 mass %
Methyl methacrylate monomer: 0.2 mass %
Methyl methacrylate macromonomer: 8.4 mass %
(macromonomer having a weight average molecular weight of 5000 and having a methacryloyl group at one terminal)
Toluene: 31.3 mass %
Methyl ethyl ketone: 31.3 mass %
Azobisisobutyronitrile: 2.0 mass %

Among the materials listed above, the cyclohexyl methacrylate monomer, methyl methacrylate monomer, methyl methacrylate macromonomer, toluene and methyl ethyl ketone were placed in a four-mouthed separable flask equipped with a reflux condenser, a temperature gauge, a nitrogen inlet tube and a stirrer, and nitrogen gas was introduced so as to satisfactorily obtain a nitrogen atmosphere. The temperature was then increased to 80° C., the azobisisobutyronitrile was added, and polymerization was carried out for 5 hours while refluxing. Hexane was introduced into the obtained reaction product so as to precipitate a copolymer, and the precipitate was filtered and then vacuum dried so as to obtain coating resin 1.

Next, 30 parts of coating resin 1 was dissolved in 40 parts of toluene and 30 parts of methyl ethyl ketone so as to obtain polymer solution 1 (solid content: 30 mass %).

Preparation of Coating Resin Solution 1

Polymer solution 1 (solid resin content concentration 30%): 33.3 mass %
Toluene: 66.4 mass %
Carbon black (Regal 330 available from Cabot Corporation): 0.3 mass %
(primary particle diameter: 25 nm, nitrogen adsorption specific surface area: 94 m²/g, DBP absorption number: 75 mL/100 g)

The materials listed above were dispersed for 1 hour in a paint shaker using zirconia beads having diameters of 0.5 mm. The obtained dispersed solution was filtered using a 5.0 µm membrane filter to obtain coating resin Solution 1.

Production Example of Magnetic Carrier 1

Resin Coating Step:

The magnetic core particles 1 and coating resin solution 1 were introduced into a vacuum deaeration type kneader maintained at normal temperature (the amount of coating resin solution 1 introduced was such that the amount of resin component was 2.5 parts relative to 100 parts of the magnetic core particles 1).

Following the introduction, stirring was carried out for 15 minutes at a rotational speed of 30 rpm, and after at least a certain amount (80 mass %) of the solvent had evaporated, the temperature was increased to 80° C. while mixing under reduced pressure, toluene was distilled off over a period of 2 hours, and cooling was then carried out. Magnetic carrier 1 having a 50% particle diameter on a volume basis (D50) of 38.2 µm was then obtained by separating particles having a low magnetic force from the obtained magnetic carrier by means of magnetic separation, passing the magnetic carrier through a sieve having an opening size of 70 µm, and then classifying using an air classifier.

Production Example of Two Component Developer 1

Two component developer 1 was obtained by mixing 92.0 parts of magnetic carrier 1 and 8.0 parts of toner 1 using a V type mixer (a V-20 available from Seishin Enterprise Co., Ltd.).

Production Examples of Two Component Developers 2 to 18

Two component developers 2 to 18 were obtained using a similar procedure to that used in the production example of two component developer 1, except that the toner was altered in the manner shown in Table 3.

TABLE 3

| Example number | Two component developer No. | Toner No. | Magnetic carrier No. |
|---|---|---|---|
| 1 | 1 | 1 | 1 |
| 2 | 2 | 2 | 1 |
| 3 | 3 | 3 | 1 |
| 4 | 4 | 4 | 1 |
| 5 | 5 | 5 | 1 |
| 6 | 6 | 6 | 1 |
| 7 | 7 | 7 | 1 |
| 8 | 8 | 8 | 1 |
| 9 | 9 | 9 | 1 |
| 10 | 10 | 10 | 1 |
| 11 | 11 | 11 | 1 |
| 12 | 12 | 12 | 1 |
| 13 | 13 | 13 | 1 |
| 14 | 14 | 14 | 1 |
| C.E. 1 | 15 | 15 | 1 |
| C.E. 2 | 16 | 16 | 1 |
| C.E. 3 | 17 | 17 | 1 |
| C.E. 4 | 18 | 18 | 1 |

In the table, "C.E." denotes "Comparative Example".

Evaluation of Toner Characteristics

The following evaluations were performed using two component developers 1 to 18 and toners 1 to 18. The results are shown in Table 4.

Evaluation of Transferability

Transferability was evaluated using two component developers 1 to 18.

Paper: GF-0081 (81.0 g/m²) (available from Canon Marketing Japan Inc.)
Toner laid-on level in solid image: 0.35 mg/cm²
Primary transfer current: 30 µA
Test environment: Normal temperature normal humidity environment (at a temperature of 23° C. and a relative humidity (RH) of 50%)
Processing speed: 377 mm/s A two-component developer to be evaluated was placed in an image forming apparatus (a commercially available full color digital copying machine (CLC1100 available from Canon Inc.)) and subjected to the evaluations below.

Toner remaining on the photosensitive member following primary transfer and toner prior to primary transfer on the photosensitive member were each tape-bonded using a transparent polyester adhesive tape, and the tape was then torn off. The torn off adhesive tape was bonded to a paper, and the density was measured using a spectral densitometer (500 series available from X-Rite Inc.).

Transfer efficiency was determined as (density prior to primary transfer-density following transfer)/density prior to primary transfer×100, and was evaluated on the basis of the evaluation criteria below. An evaluation of C or higher was assessed as achieving the advantageous effect of the present invention.

A: Transfer efficiency is at least 90%
B: Transfer efficiency is from 85% to less than 90%
C: Transfer efficiency is from 80% to less than 85%
D: Transfer efficiency is less than 80%

Evaluation of Charging Performance

The triboelectric charge quantity of the toners was measured using two component developers 1 to 18, and the charging performance of the toners was evaluated on the basis of the criteria below.

The triboelectric charge quantity for the toner was measured using an Espart Analyzer from Hosokawa Micron Corporation. The Espart Analyzer is an instrument that measures the particle diameter and charge quantity by introducing the sample particles into a detection section (measurement section) where both an electrical field and an acoustic field are simultaneously formed and measuring the velocity of particle motion by the laser doppler technique. The sample particle that has entered the measurement section of the instrument is subjected to the effects of the acoustic field and electrical field and falls while undergoing deflection in the horizontal direction, and the beat frequency of the velocity in this horizontal direction is counted. The count value is input by interrupt to a computer, and the particle diameter distribution or the charge distribution per unit particle diameter is displayed on the computer screen in real time. Once the amount of charge on a prescribed number has been measured, the screen is stopped and subsequent to this, for example, the three-dimensional distribution of charge quantity and particle diameter, the charge distribution by particle diameter, the average charge quantity (coulomb/weight), and so forth, is displayed on the screen. The triboelectric charge quantity for the toner can be measured by introducing the aforementioned two-component developer as the sample particle into the measurement section of the Espart Analyzer.

After the initial triboelectric charge quantity on the toner had been measured by this procedure, the two-component developer was held at quiescence for 1 week in a controlled-temperature, controlled-humidity chamber (temperature=30° C., humidity=80% RH) and the triboelectric charge quantity was then re-measured.

The triboelectric charge quantity retention rate was calculated by substituting the measurement results into the following formula and was evaluated using the criteria given below. An evaluation of B or higher was assessed as achieving the advantageous effect of the present invention.

triboelectric charge quantity retention rate (%) for the toner=(triboelectric charge quantity for the toner after 1 week)/(initial triboelectric charge quantity for the toner)×100   formula:

Evaluation Criteria

A: The triboelectric charge quantity retention rate for the toner is at least 80%.
B: The triboelectric charge quantity retention rate for the toner is at least 60% and less than 80%.
C: The triboelectric charge quantity retention rate for the toner is less than 60%.

Evaluation of Low-Temperature Fixability

An unfixed toner image (0.6 mg/cm') was formed on an image-receiving paper (64 g/m$^2$) using a commercially available full color digital copying machine (CLC1100 available from Canon Inc.).

The fixing unit was removed from a commercially available full color digital copying machine (imageRUNNER ADVANCE C5051 available from Canon Inc.) and was modified to make the fixing temperature adjustable, and this was used to carry out a fixing test on the unfixed image.

The appearance was visually evaluated when the unfixed image was fixed at normal temperature and normal humidity at a process speed of 246 mm/s. An evaluation of B or higher was assessed as achieving the advantageous effect of the present invention.

A: Fixing was possible at a temperature of not more than 120° C.
B: Fixing was possible at a temperature of more than 120° C., but not more than 140° C.
C: Fixing was possible at a temperature of more than 140° C. or there was no temperature region in which fixing was possible Evaluation of Storability When toners 1 to 18 were allowed to stand for 3 days in a constant-temperature constant-humidity chamber and then sieved for 300 seconds at a shaking amplitude of 1 mm using a sieve having an opening size of 75 μm, the amount of toner remaining on the sieve was evaluated on the basis of the criteria below. An evaluation of B or higher was assessed as achieving the advantageous effect of the present invention.

Evaluation Criteria

A: After being allowed to stand for 3 days in a constant-temperature constant-humidity chamber at a temperature of 55° C. and a relative humidity of 10% and then sieved, the amount of toner remaining on the sieve is less than 10 mass %.
B: After being allowed to stand for 3 days in a constant-temperature constant-humidity chamber at a temperature of 55° C. and a relative humidity of 10% and then sieved, the amount of toner remaining on the sieve is at least 10 mass %, but after being allowed to stand for 3 days in a constant-temperature constant-humidity chamber at a temperature of 50° C. and a relative humidity of 10% and then sieved, the amount of toner remaining on the sieve is less than 10 mass %.
C: After being allowed to stand for 3 days in a constant-temperature constant-humidity chamber at a temperature of 50° C. and a relative humidity of 10% and then sieved, the amount of toner remaining on the sieve is at least 10 mass %.

TABLE 4

| Example No. | Transferability | Charging performance | Low-temperature fixability | Storability |
|---|---|---|---|---|
| 1 | A | A | A | A |
| 2 | A | B | A | B |
| 3 | A | A | A | A |
| 4 | C | A | A | B |
| 5 | A | B | B | A |
| 6 | B | A | A | B |
| 7 | B | B | A | A |
| 8 | A | B | A | B |

TABLE 4-continued

| Example No. | Transferability | Charging performance | Low-temperature fixability | Storability |
|---|---|---|---|---|
| 9 | B | A | A | A |
| 10 | A | B | A | B |
| 11 | A | B | A | B |
| 12 | A | A | A | A |
| 13 | A | A | A | A |
| 14 | A | A | A | A |
| C.E. 1 | A | C | A | C |
| C.E. 2 | A | A | C | A |
| C.E. 3 | D | A | A | A |
| C.E. 4 | A | A | C | A |

In the table, "C.E." denotes "Comparative Example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-151254, filed Aug. 21, 2019, which is hereby incorporated by reference herein in its entirety.

What is claimed is:

1. A toner, comprising:
a toner particle that contains a binder resin and a styrene-acrylic resin,
the styrene-acrylic resin being a graft polymer having an aliphatic hydrocarbon compound segment and a styrene-acrylic segment;
the styrene-acrylic segment having a melting point of 30 to 80° C. and comprising a monomer unit represented by formula (1)

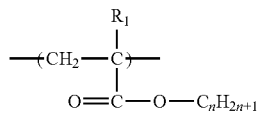

(1)

where $R_1$ denotes a hydrogen atom or a methyl group, and n denotes an integer of 22 to 30, wherein a content ratio of the monomer unit represented by formula (1) to the styrene-acrylic resin is 50 to 80 mass %, and when the toner is measured using a FT-IR ATR method, Z is 1.5 to 9.0 where $Z=(Ge\text{-}a/Ge\text{-}r)/(Dy\text{-}a/Dy\text{-}r)$, Ge-a and Ge-r are respectively the intensities assigned to the styrene-acrylic and binder resins when germanium is used as an ATR crystal, and Dy-a and Dy-r are respectively the intensities assigned to the styrene-acrylic and binder resins when diamond is used as the ATR crystal.

2. The toner according to claim 1, wherein a content ratio of the styrene-acrylic segment to the styrene-acrylic resin is 70 to 95 mass %.

3. The toner according to claim 1, wherein n is an integer of 22 to 28.

4. The toner according to claim 1, wherein n is 22.

5. The toner according to claim 1, wherein the content of the styrene-acrylic resin is 10 to 30 parts by mass relative to 100 parts by mass of the binder resin.

6. The toner according to claim 1, wherein the binder resin includes a polyester resin.

7. The toner according to claim 6, wherein the polyester resin has an alkyl group side chain having 10 to 20 carbon atoms.

8. The toner according to claim 1, wherein an aliphatic hydrocarbon compound contained in the aliphatic hydrocarbon compound segment is at least one member selected from the group consisting of polypropylene and a paraffin wax.

9. The toner according to claim 1, which has a number-based median diameter of 3.0 to 6.0 µm.

10. The toner according to claim 1, wherein the toner particle has a shell at a surface thereof, said shell comprising said styrene-acrylic resin.

11. The toner according to claim 1, wherein the toner particle is surface-treated by heat.

12. The toner according to claim 1, wherein the styrene-acrylic segment consists of a monomer unit derived from styrene and the monomer unit represented by formula (1).

13. The toner according to claim 1, wherein the content ratio of the monomer unit represented by formula (1) to the styrene-acrylic resin is 50 to 70 mass %.

* * * * *